US008701027B2

(12) United States Patent
van Dantzich et al.

(10) Patent No.: US 8,701,027 B2
(45) Date of Patent: Apr. 15, 2014

(54) SCOPE USER INTERFACE FOR DISPLAYING THE PRIORITIES AND PROPERTIES OF MULTIPLE INFORMATIONAL ITEMS

(75) Inventors: Maarten R. van Dantzich, Seattle, WA (US); Daniel C. Robbins, Seattle, WA (US); Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 2314 days.

(21) Appl. No.: 09/882,857

(22) Filed: Jun. 15, 2001

(65) Prior Publication Data

US 2002/0054117 A1 May 9, 2002

Related U.S. Application Data

(63) Continuation-in-part of application No. PCT/US01/08710, filed on Mar. 16, 2001, and a continuation-in-part of application No. PCT/US01/08711, filed on Mar. 16, 2001.

(60) Provisional application No. 60/189,801, filed on Mar. 16, 2000, provisional application No. 60/212,293, filed on Jun. 17, 2000.

(51) Int. Cl.
*G06F 3/00* (2006.01)
(52) U.S. Cl.
USPC ........... 715/768; 715/802; 715/805; 715/807; 715/853; 715/854
(58) Field of Classification Search
USPC .................. 345/706, 767, 768, 802, 805, 807, 345/853–854, 764; 715/767, 768, 802, 805, 715/807, 853, 854, 764
See application file for complete search history.

(56) References Cited

U.S. PATENT DOCUMENTS

| 4,789,962 A | 12/1988 | Berry et al. |
| 5,377,354 A | 12/1994 | Scannell et al. |

(Continued)

FOREIGN PATENT DOCUMENTS

| EP | 0420779 | 8/1990 |
| EP | 0413537 | 2/1991 |

(Continued)

OTHER PUBLICATIONS

Roel Vertegaal. Designing Attentive Interfaces. Proceedings of the Symposium on ETRA 2002: Eye tracking research and applications symposium, pp. 23-30, 2002.

(Continued)

*Primary Examiner* — Michael Roswell
(74) *Attorney, Agent, or Firm* — Aaron Chatterjee; Andrew Sanders; Micky Minhas

(57) ABSTRACT

The present invention relates to a system and methodology to provide a glanceable, interactive user interface associated with one or more prioritized informational items or notifications. Such items can be received from external sources and/or from a notification system, wherein priorities can be assigned by the sources and/or automatically determined by a computer-based prioritization system. The notifications are then arranged and/or located in a graphical display according to the assigned priorities, thus enabling a user to quickly glance at the display and determine how many items are pending, where items have originated from, and what urgency level is associated with respective items. Various shapes, locations, colors, and sounds are utilized in a variety of ergonomic configurations, some controlled by the invocation of a variety of filters and informational lenses to enable users to easily manage a plurality of information sources.

16 Claims, 20 Drawing Sheets

(56) References Cited

U.S. PATENT DOCUMENTS

| | | | |
|---|---|---|---|
| 5,423,043 A | 6/1995 | Fitzpatrick et al. | |
| 5,471,399 A * | 11/1995 | Tanaka et al. | 716/11 |
| 5,493,692 A | 2/1996 | Theimer et al. | |
| 5,508,817 A | 4/1996 | Kunigami | |
| 5,544,321 A | 8/1996 | Theimer et al. | |
| 5,555,346 A * | 9/1996 | Gross et al. | 706/45 |
| 5,555,376 A | 9/1996 | Theimer et al. | |
| 5,603,054 A | 2/1997 | Theimer et al. | |
| 5,611,050 A | 3/1997 | Theimer et al. | |
| 5,615,325 A * | 3/1997 | Peden | 715/854 |
| 5,644,363 A | 7/1997 | Mead | |
| 5,717,877 A | 2/1998 | Orton et al. | |
| 5,736,974 A | 4/1998 | Selker | |
| 5,742,905 A | 4/1998 | Pepe et al. | |
| 5,751,965 A * | 5/1998 | Mayo et al. | 709/224 |
| 5,757,916 A | 5/1998 | MacDoran et al. | |
| 5,767,852 A * | 6/1998 | Keller et al. | 715/835 |
| 5,784,124 A | 7/1998 | D'Alitalia et al. | |
| 5,812,865 A | 9/1998 | Theimer et al. | |
| 5,831,545 A | 11/1998 | Murray et al. | |
| 5,852,440 A | 12/1998 | Grossman et al. | |
| 5,859,640 A | 1/1999 | de Judicibus | |
| 5,864,848 A | 1/1999 | Horvitz | |
| 5,928,330 A | 7/1999 | Goetz et al. | |
| 5,973,612 A | 10/1999 | Deo et al. | |
| 5,987,234 A | 11/1999 | Hirosawa et al. | |
| 6,021,403 A | 2/2000 | Horvitz | |
| 6,055,505 A | 4/2000 | Elston | |
| 6,057,842 A * | 5/2000 | Knowlton et al. | 715/788 |
| 6,067,477 A * | 5/2000 | Wewalaarachchi et al. | 700/83 |
| 6,067,565 A | 5/2000 | Horvitz | |
| 6,078,322 A * | 6/2000 | Simonoff et al. | 345/744 |
| 6,094,681 A | 7/2000 | Shaffer et al. | |
| 6,101,531 A | 8/2000 | Eggleston et al. | |
| 6,144,363 A | 11/2000 | Alloul et al. | |
| 6,167,448 A | 12/2000 | Hemphill et al. | |
| 6,256,664 B1 | 7/2001 | Donoho et al. | |
| 6,262,730 B1 | 7/2001 | Horvitz et al. | |
| 6,289,380 B1 * | 9/2001 | Battat et al. | 709/224 |
| 6,301,609 B1 | 10/2001 | Aravamudan et al. | |
| 6,327,581 B1 | 12/2001 | Platt | |
| 6,337,699 B1 * | 1/2002 | Nielsen | 715/837 |
| 6,342,908 B1 | 1/2002 | Bates et al. | |
| 6,360,101 B1 | 3/2002 | Irvin | |
| 6,400,810 B1 | 6/2002 | Skladman et al. | |
| 6,425,127 B1 | 7/2002 | Bates et al. | |
| 6,437,812 B1 * | 8/2002 | Giles et al. | 345/853 |
| 6,438,215 B1 | 8/2002 | Skladman et al. | |
| 6,456,307 B1 | 9/2002 | Bates et al. | |
| 6,459,440 B1 | 10/2002 | Monnes et al. | |
| 6,459,913 B2 | 10/2002 | Cloutier | |
| 6,466,232 B1 | 10/2002 | Newell et al. | |
| 6,480,207 B1 | 11/2002 | Bates et al. | |
| 6,513,026 B1 | 1/2003 | Horvitz et al. | |
| 6,513,046 B1 | 1/2003 | Abbott, III et al. | |
| 6,549,219 B2 * | 4/2003 | Selker | 715/834 |
| 6,549,915 B2 | 4/2003 | Abbott, III et al. | |
| 6,563,514 B1 | 5/2003 | Samar | |
| 6,577,329 B1 | 6/2003 | Flickner et al. | |
| 6,584,502 B1 | 6/2003 | Natarajan et al. | |
| 6,590,587 B1 * | 7/2003 | Wichelman et al. | 345/736 |
| 6,591,279 B1 | 7/2003 | Emens et al. | |
| 6,593,943 B1 | 7/2003 | MacPhail | |
| 6,601,012 B1 | 7/2003 | Horvitz et al. | |
| 6,618,716 B1 | 9/2003 | Horvitz | |
| 6,622,160 B1 | 9/2003 | Horvitz | |
| 6,650,902 B1 | 11/2003 | Richton | |
| 6,714,967 B1 | 3/2004 | Horvitz | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,829,639 B1 | 12/2004 | Lawson et al. | |
| 6,842,877 B2 * | 1/2005 | Robarts et al. | 715/708 |
| 6,965,917 B1 | 11/2005 | Aloni et al. | |
| 7,016,944 B1 | 3/2006 | Meyer et al. | |
| 7,069,309 B1 | 6/2006 | Dodrill et al. | |
| 7,073,129 B1 | 7/2006 | Robarts et al. | |
| 7,209,955 B1 | 4/2007 | Major et al. | |
| 7,243,130 B2 | 7/2007 | Horvitz et al. | |
| 7,249,159 B1 | 7/2007 | Horvitz et al. | |
| 7,417,650 B1 | 8/2008 | Horvitz | |
| 7,457,879 B2 | 11/2008 | Horvitz et al. | |
| 7,565,403 B2 | 7/2009 | Horvitz et al. | |
| 7,634,528 B2 | 12/2009 | Horvitz et al. | |
| 7,844,666 B2 | 11/2010 | Horvitz et al. | |
| 7,975,015 B2 | 7/2011 | Horvitz et al. | |
| 8,019,834 B2 | 9/2011 | Horvitz et al. | |
| 8,024,415 B2 | 9/2011 | Horvitz et al. | |
| 2001/0030667 A1 * | 10/2001 | Kelts | 345/854 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2001/0049275 A1 | 12/2001 | Pierry et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0087649 A1 | 7/2002 | Horvitz | |
| 2002/0099817 A1 | 7/2002 | Abbott et al. | |
| 2002/0174199 A1 | 11/2002 | Horvitz | |
| 2003/0028603 A1 | 2/2003 | Aktas et al. | |
| 2003/0046401 A1 | 3/2003 | Abbott et al. | |
| 2003/0154476 A1 | 8/2003 | Abbott, III et al. | |
| 2004/0030753 A1 | 2/2004 | Horvitz | |
| 2004/0061716 A1 | 4/2004 | Cheung et al. | |
| 2004/0225718 A1 | 11/2004 | Heinzel et al. | |
| 2005/0034078 A1 | 2/2005 | Abbott et al. | |
| 2005/0050143 A1 | 3/2005 | Gusler et al. | |
| 2005/0248437 A1 | 11/2005 | Hellebust et al. | |

FOREIGN PATENT DOCUMENTS

| | | | |
|---|---|---|---|
| EP | 0867823 A2 | 9/1998 | |
| EP | 0963646 A2 | 12/1999 | |
| EP | 0905633 A3 | 7/2000 | |
| EP | 1052817 A2 | 11/2000 | |
| EP | 1003308 B1 | 9/2003 | |
| GB | 2328110 | 10/1999 | |
| JP | 08314827 A | 11/1996 | |
| JP | 9-101990 | 4/1997 | |
| JP | 9-212505 | 8/1997 | |
| JP | 10079756 A | 8/1998 | |
| JP | 11-205465 | 7/1999 | |
| JP | 11-316635 | 11/1999 | |
| WO | 9635994 | 11/1996 | |
| WO | 9738382 | 10/1997 | |
| WO | 9800787 | 1/1998 | |
| WO | 9837680 | 8/1998 | |
| WO | 9847268 | 10/1998 | |
| WO | 9858321 | 12/1998 | |
| WO | 9906915 | 2/1999 | |
| WO | 9941720 | 8/1999 | |
| WO | 9967731 | 12/1999 | |
| WO | 0036493 | 6/2000 | |
| WO | 0169387 A2 | 9/2001 | |
| WO | 0239761 | 5/2002 | |
| WO | 02065250 A2 | 8/2002 | |
| WO | 2004025912 A2 | 3/2004 | |

OTHER PUBLICATIONS

Jeffrey S. Shell, Ted Selker, and Roel Vertegaal. Interacting with Groups of Computers. Communications of the ACM, vol. 46 Issue 3, pp. 40-46, 2003.

(56) References Cited

OTHER PUBLICATIONS

D. Scott McCrickard and C.M. Chewar. Attuning Notification Design to User Goals and Attention Costs. Communications of the ACM, vol. 46 Issue 3, pp. 67-72, 2003.
Andy Harter, et al., A Distributed Location System for the Active Office, IEEE Network, 1994, pp. 62-70.
Guanling Chen, et al., A Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, in Fourth Workshop on Workstation Operating Operating Systems, 1993, 7 pages.
Roy Want, Active Badges and Personal Interactive Computing Objects, IEEE Transactions on Consumer Electronics, 1992, 11 pages, vol. 38—No. 1.
Bill N. Schilit, et al., The ParcTab Mobile Computing System, IEEE WWOS-IV, 1993, 4 pages.
Bill Schilit, et al., Context-Aware Computing Applications, in Proceedings of the Workshop on Mobile Computing Systems and Applications, Dec. 1994. pp. 85-90.
Bill N. Schilit, et al., Customizing Mobile Applications, Proceedings USENIX Symposium on and Location Independent Computing, Aug. 1993, 9 pages.
Mike Spreitzer, et al., Architectural Considerations for Scalable, Secure, Mobile Computing with Location Information, in the 14th International Conference on Distributed Computing Systems, Jun. 1994. pp. 29-38.
Mike Spreitzer et al., Scalable, Secure, Mobile Computing with Location Information, Communications of the ACM, Jul. 1993, 1 page, vol. 36—No. 7.
Roy Want, et al., The Active Badge Location System, ACM Transactions on Information Systems, Jan. 1992, pp. 91-102, vol. 10—No. 1.
Mark Weiser, Some Computer Science Issues in Ubiquitous Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of the First International Conference on the Practical Application of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of the First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, et al., Disseminationg Active Map Information to Mobile Hosts, IEEE Network, 1994, pp. 22-32, vol. 8—No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May 1998, 48 pages.
Mark Weiser, The Computer for the 21st Century, Scientific American, Sep. 1991, pp. 94-104, vol. 265—No. 3.

T. Joachims, Text categorization with support vector machines: learning with many relevant features, Machine Learning, European Conference on Machine Learning, Apr. 21, 1998, pp. 137-142.
International Search Report dated Sep. 29, 2003 for PCT Application Serial No. 00/20685, 3 Pages.
Robert M. Losee, Jr., Minimizing information overload: the ranking of electronic messages, Journal of Information Science 15, Elsevier Science Publishers B.V., 1989, pp. 179-189.
International Search Report dated Jun. 28, 2006 for International Patent Application Serial No. PCT/US04/19915, 4 pages.
Sofus A. MacSkassy, et al., EmailValet: Learning Email Preferences for Wireless Platforms, Rutgers University, User Modeling 1999 Workshop—Machine Learning for User Modeling, Jun. 3, 1999, 4 pages.
Café: A Conceptual Model for Managing Information in Electronic Mail, Juha Takkinen and Nahid Shahmehri, Laboratory for Intelligent Information Systems (IISLAB), Department of Computer Information Science, Linkoping University, Sweden, pp. 44-53.
European Search Report dated Jul. 5, 2004 for Application No. EP 04 00 0621, 5 pages.
European Search Report dated Sep. 28, 2005 for Application No. EP 05 10 5299, 4 pages.
Nitin Sawhney, et al. Nomadic Radio: Speech and Audio Interaction for Contextual Messaging in Nomadic Environments. ACM Transactions on Computer-Human Interaction. ACM, Sep. 1, 2000. pp. 353-383.
International Search Report dated Sep. 2, 2002, for International Application Serial No. PCT/US01/08710.
Paul E. Baclace, Competitive Agents for Information Filtering, Dec. 1999, 1 page.
M. Marx, et al., Clues: Dynamic Personalized Message Filtering, Proceedings of the ACM 1996 Conference on Computer Supported Cooperative Work, Boston, Nov. 16-20, 1996, pp. 113-121.
Robert M. Losee Jr., Minimizing Information Overload: The Ranking of Electronic Messages, 1989, 11 pages.
Gary Boone, Concept Features in Re: Agent, an Intelligent Email Agent, 1998, 8 pages.
William W. Cohen, Learning Rules that Classify E-Mail, 1996, 11 pages.
Makoto Iwayama, et al., Hierarchical Bayesian Clustering for Automatic Text Classification, 1995, 6 pages.
M. Sahami, et al. A Bayesian approach to filtering junk email, in Workshop on learning for text categorizations, 1998, 8 pages, AAI Technical Report WS-98-05, AAAI.
D. Koller, et al. Toward optimal feature selection, in proceedings of 13th conference on machine learning, 1998, pp. 284-292, Morgan Kaufmann, San Francisco.
E. Horvitz, et al. The Lumiere project: Bayesian user modeling for inferring the goals and needs of software users, in proceedings of the 14th conf on uncertainty in AI, 1998, pp. 256-265, Morgan Kaufmann, San Francisco.
J. Platt, Probabilistic outputs for support vector machines and comparisons to regularized likelihood methods, in Advances in Large Margin Classifiers, 1999, 11 pages, MIT Press, Cambridge, MA.
H. Leiberman, Letizia: An Agent that assists web browsing, in proceedings of IJCAI-95, 1995, 6 pages, Montreal Canada, Morgan Kaufmann, San Francisco.
Horvitz, et al. Display of Information for time-critical decision making, in Proceedings of the 11th Conf on uncertainty in AI, 1995, pp. 296-305, Monetrea, Canada.
M. Czerwinski, et al. Visualizing implicit queries for information management and retrieval, in proceedings of CHI'99, ACM SIGCHI Conf on informational and knowledge management, 1999, pp. 560-567, ACM.
S. Dumais, et al. Inductive learning algorithms and representations for text categorization, in proceedings of 7th Intl Conf on Information and Knowledge Management, 1998, pp. 148-155, ACM.
Platt, Fast training of support vector machines using sequential minimal optimization, in advances in kernel methods, support vector learning, 1999, pp. 41-65 MIT Press, Cambridge, MA.
Horvitz, Principles of mixed-initiative user interfaces, in proceedings of CHI'99, ACM SIGCHI Conf on Human Factors in Computing Systems, 1999, pp. 159-166, Pittsburgh, PA, ACM.

(56) References Cited

OTHER PUBLICATIONS

Breese, et al. Empirical analysis of predictive algorithms for collaborative filtering, in proceedings of the 14th conf on uncertainty in AI, 1998, pp. 43-52, AUAI, Morgan Kaufmann, San Francisco.

Horvitz, Time dependent utility and action under uncertainty, in proceedings of 7th conf on uncertainty in AI, LA, CA, 1991, pp. 151-158, Morgan Kaufmann, San Francisco.

Horvitz, Time-critical action: representations and application, in proceedings of the 13th conf on uncertainty in AI (UAI-97), 1997, pp. 250-257, Providence, RI, Morgan Kaufmann, San Francisco.

Costas Tsatsoulis, et al., Integrating Case-Based Reasoning and Decision Theory, 1997, 10 pages.

Francis Chu, et al., A Decision-Theoretic Approach to Reliable Message Delivery,1998, 15 pages.

Yu Lo Cyrus Chang, et al., Bayesian Analysis for Fault Location in Homogeneous Distributed Systems, 1993, 10 pages.

Alec Cameron, et al., Identifying and Localizing Electrical Components: A Case Study of Adaptive Goal-directed Sensing, 1997, 6 pages.

Nitin Sawhney, et al., Speaking and Listening on the Run: Design for Wearable Audio Computing, 1998, 8 pages.

Doree Duncan Sehgmann, et al., The Message is the Medium, 1997, 12 pages.

Jacob Palme, et al., Issues When Designing Filters in Messaging Systems, 1996, 7 pages.

Chaomei Chen, Visualizing Semantic Spaces and Author Co-citation Networks in Digital Libraries, 1999, 20 pages.

M. Van Dantzich, D. Robbins, E. Horvitz, and M. Czerwinski. Scope: Providing Awareness of Multiple Notifications at a Glance. In Proceedings of AVI 2002, ACM Conference on Advanced Visual Interfaces, 2002. 11 pages.

Jonathan Isaac Helfman, et al., Ishmail: Immediate Identification of Important Information, 1995, 8 pages.

Peter Haddawy, An Overview of Some Recent Developments in Bayesian Problem-Solving Techniques Introduction to This Special Issue, 1999, 9 pages.

Finn V. Jensen, Bayesian Networks Basics, Winter 1995/Spring 1996, 14 pages.

Sanguk Noh, et al., Rational Communicative Behavior in Anti-Air Defense, 1998, 8 pages.

Eric Horvitz, et al., Models of Attention in Computing and Communication: From Principles to Applications, Communications of the ACM 46(3): 52-29, Mar. 2003.

Marti A. Hearst, et al., Machine Learning in Information Access Papers from the 1996 AAAI Spring Symposium, 1996, 3 pages.

Horvitz, et al., "Attention-Sensitive Alerting," Proceedings of Fifteenth Conference Conference on Uncertainty in Artificial Intelligence (UAI'99), pp. 305-313, Aug. 1999.

Losee, "Minimizing information overload: the ranking of electronic messages," Journal of Information Science, V15, pp. 179-189, 1989.

Notice of Rejection (English translation) mailed on Sep. 7, 2010 in Japanese Patent Application No. 2001-567443, 5 pages.

Final Rejection (English translation) mailed on Dec. 28, 2010 in Japanese Patent Application No. 2001-567443, 2 pages.

Interrogation (English translation) mailed on Dec. 20, 2011 in Japanese Patent Application No. 2001-567443, 4 pages.

\* cited by examiner

SCOPE USER INTERFACE FOR DISPLAYING THE PRIORITIES AND PROPERTIES OF MULTIPLE INFORMATIONAL ITEMS

REFERENCE TO RELATED APPLICATIONS

This application is a continuation in part of PCT application Ser. No. PCT/US01/08710, which was filed Mar. 16, 2001, entitled PRIORITIES GENERATION AND MANAGEMENT and of PCT application Ser. No. PCT/US01/08711, which was filed Mar. 16, 2001, entitled NOTIFICATION PLATFORM ARCHITECTURE, both of which claim the benefit of U.S. Provisional Patent Application Ser. No. 60/189,801, which was filed Mar. 16, 2000, entitled ATTENTIONAL SYSTEMS AND INTERFACES. This application also claims the benefit of U.S. Provisional Patent Application Ser. No. 60/212,293, which was filed Jun. 17, 2000, entitled SCOPE USER INTERFACE FOR A NOTIFICATION PLATFORM.

TECHNICAL FIELD

The present invention relates generally to computer systems, and more particularly to a system and method to provide a non-intrusive, glanceable and updateable interactive interface associated with a notification platform architecture, wherein prioritized information or notifications and/or indications thereof are rendered across various classes, domains and/or sources of information and communications.

BACKGROUND OF THE INVENTION

With the growth of computer and information systems, and related network technologies such as wireless and Internet communications, ever increasing amounts of electronic information are communicated, transferred and subsequently processed by users and/or systems. As an example, electronic mail programs have become a popular application among computer users for generating and receiving such information. However, with the heightened popularity of e-mail and other communications systems, problems have begun to appear in regard to managing and processing increasing amounts of information from a plurality of sources.

Among these problems, many users now face a deluge of e-mail and/or other information to sort through, manage and/or respond to, such that the capability of being able to send, receive and process information has almost become a hindrance to being productive. For example, some users report receiving over 100 e-mail messages a day. With such large numbers of received electronic information, it has thus become difficult to manage information according to what is important and what is not as important without substantially expending valuable time to make a personal determination as to the importance of each received piece of information. As an example of these determinations, users may have to decide whether messages should be responded to immediately, passed over to be read at a later time, or simply deleted due to non-importance (e.g., junk mail). As can be appreciated, having to personally inspect and determine whether a plurality of received items should be responded to or discarded can take valuable time away from more productive activities. It also can be a distraction to continually check and peruse an inbox, for example, regarding messages that are received over time.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to provide a glanceable, interactive user interface associated with one or more prioritized items. These items, can come in the form of information or notifications, and can be received from external sources and/or from a notification system, wherein priorities can be assigned by the sources and/or automatically determined by a prioritization system. The notifications are then arranged and/or located in a graphical display according to the assigned priorities, thus enabling a user to quickly glance at the display and determine how many items are pending, where items have originated from, and what urgency level is associated with respective items. Other informational properties of the items may also be included in the form of graphical and text features, some of which may be revealed upon user interaction, whereby users employ one or more gestures or actions to access or filter the informational items in one or more ways. Various shapes, locations, colors, and sounds are utilized in a variety of ergonomic configurations to enable users to easily manage a plurality of information sources. A default display can be provided that presents an overview of pending notifications, for example. Through interaction, the user can obtain increasing detail of information about displayed notifications as suitable to the type of the item.

The present invention enables information and communications systems to transmit maximal amounts of information about the state of one or more items with minimal user disruption by providing a centralized user interface for information and notifications, and by adapting the saliency of information and notifications depending on the assigned priority. This can be achieved utilizing techniques such as fading, highlighting, and/or audio feedback, for example. Other features of the interface can include instant replay of prior item arrivals, force directed layouts, crystal balls, three-dimensional renderings, and/or radar views of notifications such as can be arranged in a circular-radar or on a horizon, for example. In addition, input from the user interface can be monitored by a notification or priorities system as feedback for training these systems in accordance with what the user considers important and/or less important notifications.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
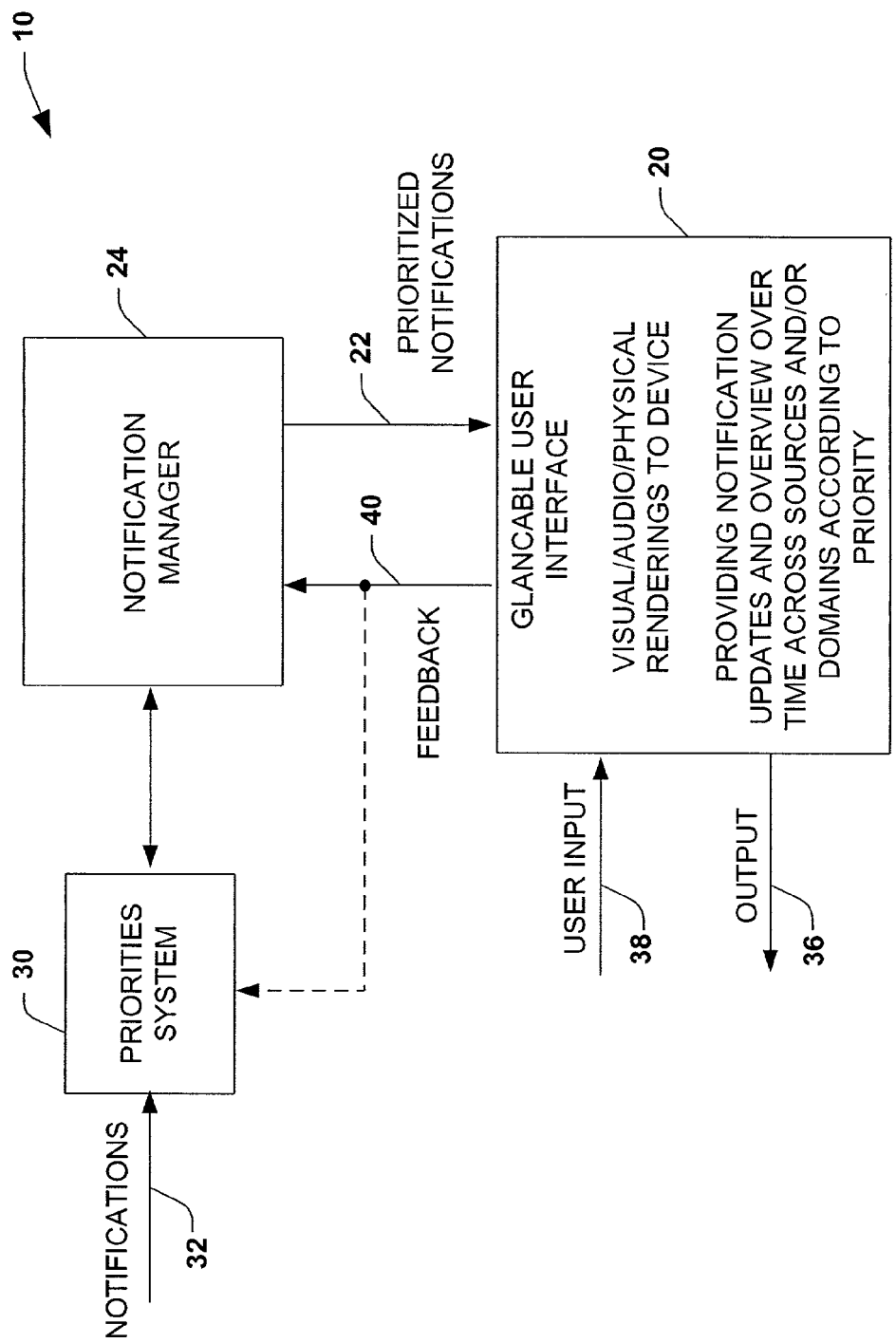
FIG. 1 is a schematic block diagram of a user interface and notification/priorities system in accordance with an aspect of the present invention.

The present invention relates to a system and methodology providing a configurable and adaptable user interface for interacting with a plurality of notifications. This can be achieved by providing a visual overview of incoming information, making it clear at a glance how many items associated with an inbox, for example, are waiting for a user, how important the items are, and what main areas of life and/or work the items pertain to. The user interface of the present invention is glanceable since it provides an overview display; unifies multiple sources; and locates important items in the center of the display, for example, to enable a singular point of focus. According to one aspect of the present invention, the interface can be represented as a circle or other shape that resides in the corner or other area of a desktop display screen, possibly transparently blended over other windows, or potentially presented in a faded/translucent manner.

Because of the compact nature of the display, it is also well suited to alternative computing and/or communication devices, such as cell-phones with large displays, watches with large displays, and Personal Digital Assistants (PDA's). This provides an interface for notifications or other information that is consistent across multiple electronic devices. Accommodations are made, with particular devices and for different types of input modalities. While mouse interaction may function effectively on a desktop computer, a PDA can utilize a different form of interaction such as quick inspection via a small number of hardware buttons on the device itself. When an input device such as a mouse has selected the interface, or when the interface has received urgent information, for example, the interface can solidify into a radar screen or other configuration, for example.

The interface provides an organizational metaphor, wherein information is directed at users from various directions and information sources, and indicates what is presently important. A priorities system can be provided that assigns an urgency/importance rating to incoming notifications/items received from a plurality of sources, thus enabling arrangement of the items according to one or more non-distracting and user-friendly renderings. For example, urgent items can be located closer to the center of the interface enabling users to quickly glance over less important items. These items can also be grouped according to one or more sectors (e.g., radially) by domain, grouping together work-related items, family items, news headlines, and so forth. Alternatively, items can be grouped into sectors according to the origin or delivery medium of a notification such as the type (e.g., e-mail, instant message, news item, voice mail, appointments, tasks with deadlines, proximity of friends, and so forth). The display items may be rendered in the shape and/or color of the associated wedge or shape, for example. Furthermore, the interface can be adapted such that whenever a user glances at the interface, it can distinguish newly added items.

Generally, text is not shown on the interface display, until an action such as a mouse-over occurs over selected display objects, however, items displayed on the interface can reveal summary information when inspected, and opened when clicked, for example. However, in some versions, textual properties can be included. The interface can provide handles for controlling both the display and the more general rendering of communications. For example, the display can serve to enable users to control when incoming items should cause an audible and/or visual notification, for example. This can be achieved via a "swipe out" of a region around the center of the display, for example, that represents a high enough priority that indicates that the user desires to be interrupted. Messages or notifications that arrive in this region can cause an alert. Thus, the priority threshold for alerts can be adjusted with a manipulation of a context of a current overview, for example, rather than with an abstract priority level or number. Category wedges or sectors can also be modified with user directed manipulation. Thus, users can drag new "magnets" onto the interface which will influence item placement based on affinity with the magnet, type a label, and drag and drop to re-arrange the size and ordering of the shapes.

In view of the above, the present invention provides an easy overview, inspection-at-a-glance interface. This can be achieved via "light-weight to render" vector graphics that are rasterized into bitmap graphics at run-time. Thus, the interface can be compacted to fit on a portable personal computer or other hand-held device such as a cell phone or watch. Extendibility can also be provided in accordance with the present invention. For example, "Fish-eye" techniques can be included for interface scalability. A selectable distortion can be provided to enable more space for one sector but preserve relative placements within the sector. The interface can also be augmented with a first-person view with items arranged as approaching the user. This augmentation can also occur with time stretching in a 3rd dimension, for example, whereby the user looks back in time for a history.

According to other aspects of the present invention, items such as wedge/section objects can be animated when expanded for more detail, for example. Substantially every item to be displayed can be animated, wherein appearance animation can be utilized when a new item is added or if the display is changed when inspected. Items can have "visual annotations" that distinguish properties of the item they represent. This splits into a primary item type, determining the major appearance, and the "annotations", adding detail. Associated data employed can include: Item type or domain type; newness, summary of message content, type of addressee (e.g., only the current user, as opposed to a large mailing list), type of sender (e.g., a manager or co-worker, a contact found in the user's electronic address list, an unknown address), whether the message is part of an ongoing exchange, and so forth.

Other aspects can include normalizing an axis of priority across sectors, or varying by sector according to the density of higher priority items. Generally, a non-rectangular window is utilized for display however a plurality of shapes and sizes can be employed. For example, a wedge can be collapsed down to a radial line with glommed items displayed on it, thus depicting the distribution of items across a priority dimension in the collapsed wedge. Meeting, Task or other items, for example, can also be prioritized depending on the amount of work (or prep work) to be done.

Referring initially to FIG. 1, a system 10 illustrates a user interface 20 in accordance with an aspect of the present invention. The user interface 20 receives a plurality of prioritized notifications 22 from a notification manager 24 and provides visual, audio and/or physical (e.g., vibration) renderings to a device such as a computer display screen or hand held device such as an electronic wristwatch, a personal digital assistant or cellular phone. A priorities system 30 can be provided to assign a priority or urgency factor to one or more notifications 32 that can be received from a plurality of information sources (not shown). It is noted that the priorities system 30 can automatically assign priorities to the notifications 32 via an automated system and/or can assign priorities via a manually determined system such as by a subscription service, for example.

Based in part upon the assigned priorities, the user interface 20 provides an organizational framework or metaphor in which to display or render the prioritized notifications 22 over time. The display/renderings are depicted as an output 36 that is directed to the user. For example, the output 36 can appear as an unobtrusive, translucent and/or transparent display while the user is busy or working and is selectable to become non-transparent/translucent if the user desires to observe notifications and/or notification activity. Context monitors (e.g., camera/microphone inputs, calendar, clock) that are described in more detail below can be provided that alter the display (e.g., transparent to active foreground display) based upon the sensed activity or context of the user and/or assigned priority/source/domain of the notifications 32.

The display can be arranged according to one or more sectors that can further be arranged, shaped and colored according to the source of the notifications 32 (e.g., e-mail, voice mail, instant messaging) and/or can be arranged, shaped and colored according to a domain that defines how the message pertains to the user (e.g., work, family, hobby, financial). The one or more sectors of the display can be grouped, wherein the grouping of sectors is further categorized or partitioned according to the priority of the prioritized notifications 22. For example, one or more notifications 32 received from an e-mail source may be assigned to a green sector, wherein the prioritized notifications 22 which are related to the notifications 32 can be associated with one or more display objects that are located within and about the green sector according to the assigned priority of the e-mail provided by the priorities system 30.

In accordance with one particular aspect of the present invention, the display can be arranged as a circular scope having one or more concentrically located divisions on the scope. The radius of respective rings can vary from sector to sector in order to accommodate different numbers of objects in division for the associated sector. The display objects associated with a higher assigned priority can be located in one division or boundary of the associated sector (e.g., closer to center), whereas display objects associated with a lower priority can be located in another division (e.g., outer edges of display)—or vice versa.

It is to be appreciated that there can be a plurality of such sectors, display objects, divisions, colors, shapes, and dimensions as will be described in more detail below. It is also to be appreciated that a scope is just one of but many possible arrangements in accordance with the present invention. For example, display objects can be arranged on a horizon, wherein display objects appearing closer can be considered as higher priority and objects appearing further on the horizon can be associated with lower priorities. This can also include locating display objects on the horizon based on time, for example, wherein newer or older notifications 32 are located according the recentness of the notification (e.g., left, right, center, farther, and closer on the horizon based on the time the notification was received). Other dimensions can also be displayed to reflect the time or priority of the notifications 32. For example, one or more displays can be provided that can be arranged as three-dimensional layers of display (e.g., layers arranged as partially or transparently overlapping and/or directed toward or away the user), wherein respective layers can indicate display objects with varying degrees of priorities and/or varying degrees of elapsed time from when the notifications 32 were received.

It is noted that the output 36 can also be provided to users according to other indications. For example, if a high priority notification 22 were to be received, a loud or repetitive sound can be rendered, whereas if a lower priority message were received, a lower volume/less repetitive sound can be rendered. This can also include an actual rendering of the notification 32 or summary of the notification such as playing an audio feed of the notification 32 or providing audio information such as "Message from home." The output 36 can also include physical renderings associated with priority such as controlling the repetition of and/or intensity of vibrations of a hand held device such as a cell phone or pager.

In accordance with another aspect of the present invention, the user interface 20 can receive and respond to user input 38. This can include mouse clicking, keyboard strokes, verbal commands and/or other user context indications. For example, a display object can be selected via a mouse and provide a summary of the underlying notification 32. Further user actions can "drill-down" to the actual notification as desired. The user input 38 can also be utilized to re-size, alter, move, close, and open the display described above and/or alter the characteristics of the display such as switching from two dimensional to a three dimensional display and/or switching from source display to domain display. This can also include providing feedback 40 from the user interface 20 to the notification manager 24 and/or the priorities system 30 based upon the user input 38. The feedback 40 can include indications of the user's preferences regarding assigned priorities and/or the notifications 22 and can include implicit and/or explicit reactions of the user that can be utilized to adjust/configure the notification manager 24 and/or the priorities system 30 as will be described in more detail below.

Figure 2:
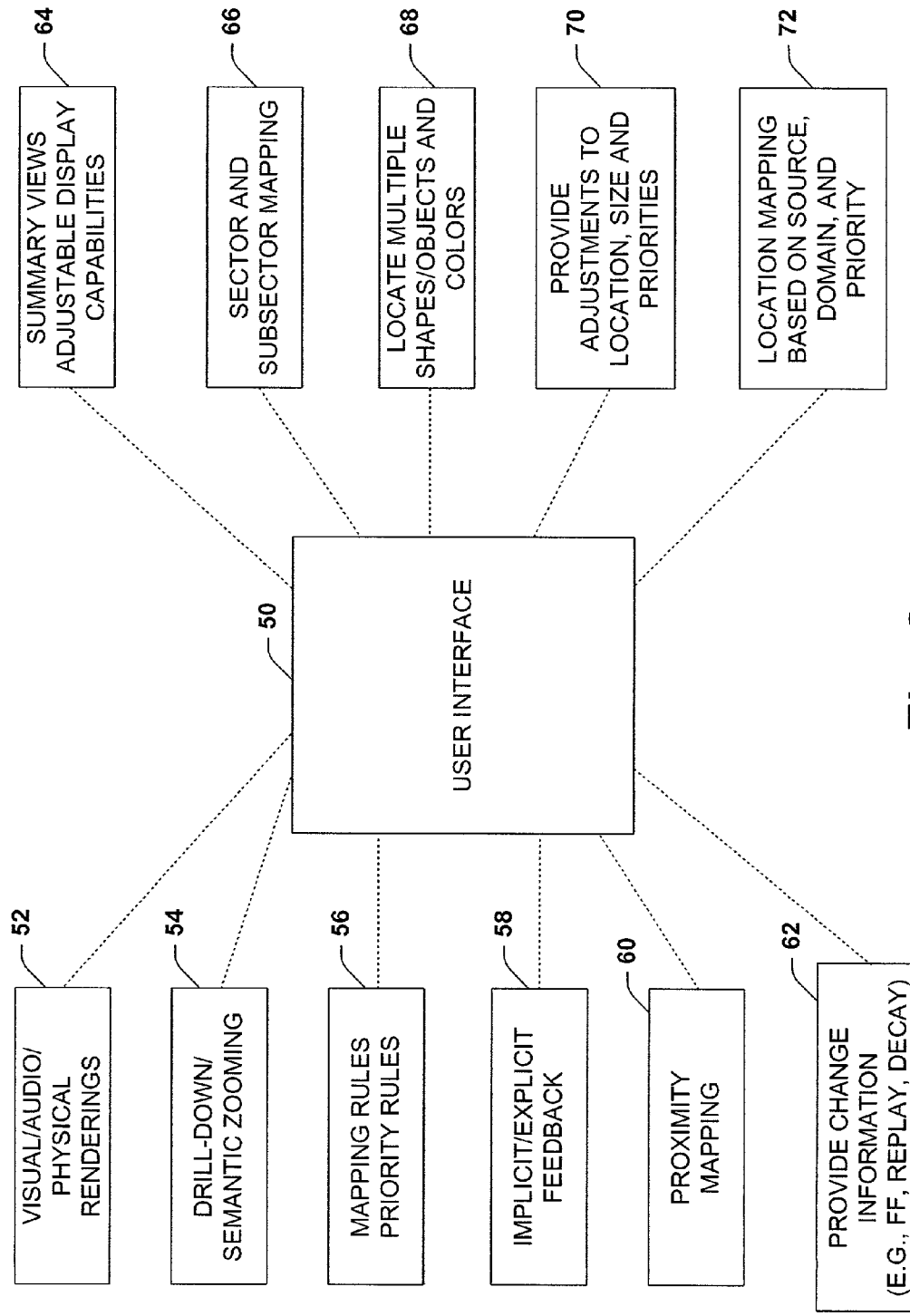
FIG. 2 is a block diagram illustrating a user interface and associated methods in accordance with an aspect of the present invention.
Figure 3:
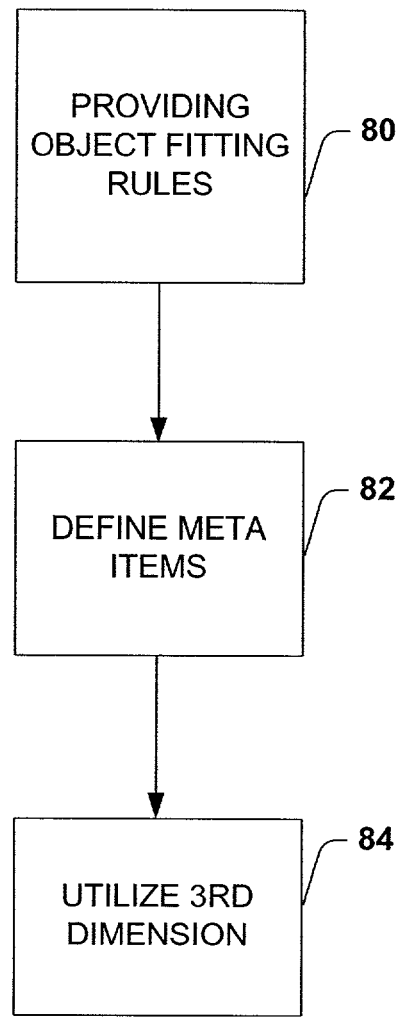
FIG. 3 is a flow diagram of a methodology for displaying objects in accordance with an aspect of the present invention.
Figure 4:
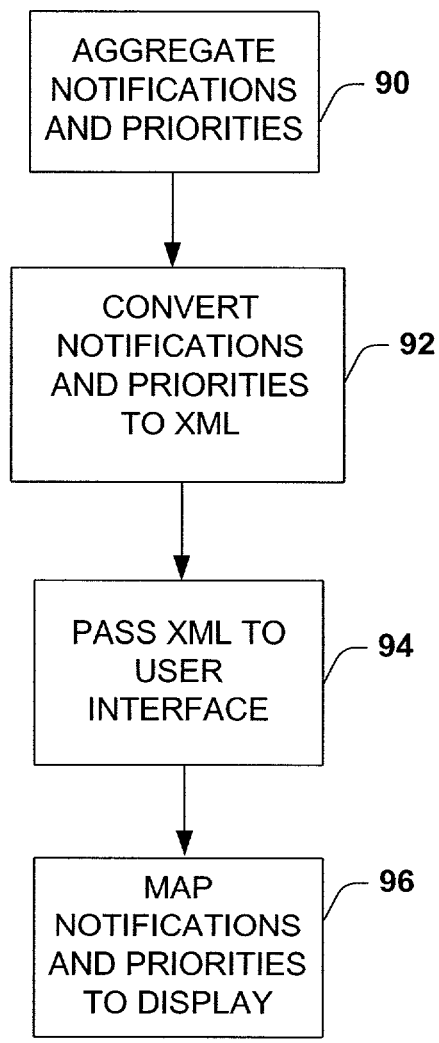
FIG. 4 is a flow diagram for mapping display objects in accordance with an aspect of the present invention.

FIGS. 2, 3 and 4 illustrate methodologies for providing a user interface in accordance the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring now to FIG. 2, a block diagram illustrates an interface 50 and associated methods in accordance with an aspect of the present invention. The interface 50 can provide one or more aspects 52-72 to provide notifications and updates over time in a pleasant, timely and non-intrusive manner. As described above, this can include visual, audio, and/or physical renderings depicted at 52 that are associated with the notifications having priorities associated therewith. At 54, this can include drilling down for more detailed information regarding a respective notification that is associated with a display object. For example, this can include semantic zooming, wherein more detail is provided at each level of a user directed zooming operation (e.g., initiated by mouse, keyboard, audio commands and/or inputs providing indications of the user's visual patterns) until the full text or audio of the notification is rendered. At 56, mapping and priority rules are provided. This includes rules that direct how respective notifications are associated with a display object and are located on a display, for example. As an example, one or more rules can be provided that direct/map notifications from a particular source or domain to an area or sector of a display and associates the notification to a display object, wherein a priority rule can direct and/or map the display object within the sector or area of display based upon the assigned priority of the notification. For example, higher priority items can be mapped near the center of a display and lower priority items can be mapped to outer areas of the display. It is to be appreciated that a plurality of other mappings/rules are possible such as mapping higher priority items to the outer area of the display.

At 58, implicit and/or explicit feedback is provided from the interface 50 to the notification and/or priorities systems described above. Implicit feedback can include such actions as how fast a user responds to or reads a selected notification, including delays with interacting with a notification and whether or not a notification is deleted or saved. Explicit feedback can include direct user actions that indicate there may be some disagreement with the assigned priority or other display characteristic. For example, if a notification were assigned a high priority, and the user disagreed with the assignment, the user could drag the display object (or provide other indication, e.g., keyboard, voice) associated with the high priority notification to a portion of the display having lower priority, thus explicitly indicating to the system that messages from a particular source, domain, individual or content type should be classified to a different priority. Thus, these types of feedback can provide information to the notification manager 24 and/or priorities system 30 to alter and/or adjust decision-making processes within these systems in accordance with a user's implied and/or explicit desires.

At 60, proximity mapping can be provided with the display objects associated with the user interface 50. As an example, meaning can be provided to the user based upon how one or more display objects are grouped and/or clustered. A tightly packed grouping can indicate an increasing density of notifications from a source or domain whereas a sparser grouping can indicate less activity. Proximity can also reflect such parameters as time or priority and/or can indicate that one or more display objects are combinations of more than one notification, wherein the display object can first be selected by the user with a subsequent drill-down for a particular notification.

At 62, the interface 50 can also provide notification change information overtime to enable users to receive glanceable updates of items that arrived while they were away and/or busy with other activities. This can include providing a fast-forward or instant replay selection, wherein the user can quickly review a stored sequential display of how incoming notifications were received over time. Fading or decay options can be provided with the display objects to indicate how unattended notifications become stale over time. For example, if a notification were received that a meeting was scheduled at 2:00, the display object associated with the notification can begin to fade or decay as time passes after 2:00 and the notification has not been attended by the user. Other indications can include different colorings and/or shape alterations. Other examples'include brightening and darkening display objects based upon the assigned priority.

At 64, summary views and/or other adjustable characteristics can be provided by the interface 50. This can include providing a summary of the notification based upon a mouse-over action by the user. This can also include providing more or less displayed information based upon a resizing the display or portions thereof and will be described in more detail below. At 66, sector and sub-sector mapping is provided. This can include defining particular regions of a display to occupy a shape such as a wedge and associate the wedge with a source or a domain, for example. The shape can be further divided according to the assigned priorities of the received notifications, wherein display objects relating to the notifications are located within the sectors according to the assigned priority.

At 68, multiple shapes, objects, colors and dimensions are utilized to provide renderings to the user indicative of the notification and/or priority. For example, one or more sectors can be populated with circles, squares, rectangles, triangles or substantially any shape (e.g., icon). The sectors, which can also be referred to as display objects, can also be rendered in three dimensions such as a funnel or cylindrical shape. As an example, a circular arrangement of wedges can appear as a circle, whereas if depth were added to the display the wedges can appear as a funnel or parabolic shape. Display objects, sometimes referred to as glyphs or globs, within the sectors can be two or three-dimensional renderings similar to the sectors and/or provided as spheres, cubes, cylinders, or other shapes. The sectors can be divided according to priority in a plurality of patterns such as concentric circles, squares, rectangles, triangles, wherein display objects are located according to the assigned priorities. As can be appreciated, multiple colors and/or shadings can be provided to differentiate various sectors and display objects. It is noted that multiple qualities of an item, such as shape, size, color, and/or position, for example, can also be animated through a sequence to differentiate that item from other items.

At 70, adjustments and/or selections are provided to the user to enable alteration of the size and shape or movement of the display and to provide for adjustments to priorities as described above. This can be achieved by utilizing substantially any graphics tool for rendering, mapping, sizing, shaping, and/or dimensioning objects on the display such as vector graphics, for example, to enable user configure-ability and alteration of the display. At 72, domain, source and priority mapping is provided to enable display objects to be associated with a notification and enable mapping of the display object to a sector associated with a particular domain or source, and to enable mapping of the object within the sector based upon the assigned priority of the notification.

Turning now to FIG. 3, a flow diagram illustrates one or more clustering/de-clustering options/strategies for displaying objects in accordance with the present invention. When multiple display items are rendered to a constrained space, for example, the methodology depicted in FIG. 3 provides one or more possibilities for organizing and displaying the objects. For example, at 80, fitting rules can be provided. This may include rules such as "dropping out" or removing display objects over time as newer notifications arrive. This can also include overlapping display objects. Another rule can enable displaying only the number of objects that can fit in a designated space and then replacing display objects with more recent display objects after notifications have been reviewed, selected, inspected, or deleted by the user. Still yet another rule or algorithm can provide for mapping priority to a location to prevent overlap of objects. This can include a force directed layout to enable items to rearrange when the items become more or less crowded. In addition, decisions can be made such that the "Top N items should not be elided", wherein N is an integer. At 82, another rule can include defining meta items for a display object. In other words, a display object can itself be representative of one or more other notifications. Thus, multiple notifications from person "X" and from source "Y" could be clustered under a single display object identified as from person X. The user can subsequently receive the individual notifications associated with the meta item by such actions as mouse-clicking and drilling down on the meta item, for example. At 84, a third dimension can be utilized to display objects. This can include displaying multiple layers of display objects and/or stacking objects in visual directions to and from the user.

Referring now to FIG. 4, a flow diagram illustrates one particular aspect of the present invention for mapping notifications to a display. It is to be appreciated that a plurality of other methods are possible. At 90 received notifications or other information are assigned priorities and collected and/or aggregated at a system such as a server and/or other aggregating system. At 92, the aggregated notifications are converted to a code such as XML. It is to be appreciated other conversions are possible. At 94, the converted notifications are passed to an interface. At 96, the notifications and priorities are associated with or mapped to items such as display objects and/or display locations in accordance with the priority, source, class and/or domain of the received notifications.

Figure 5:
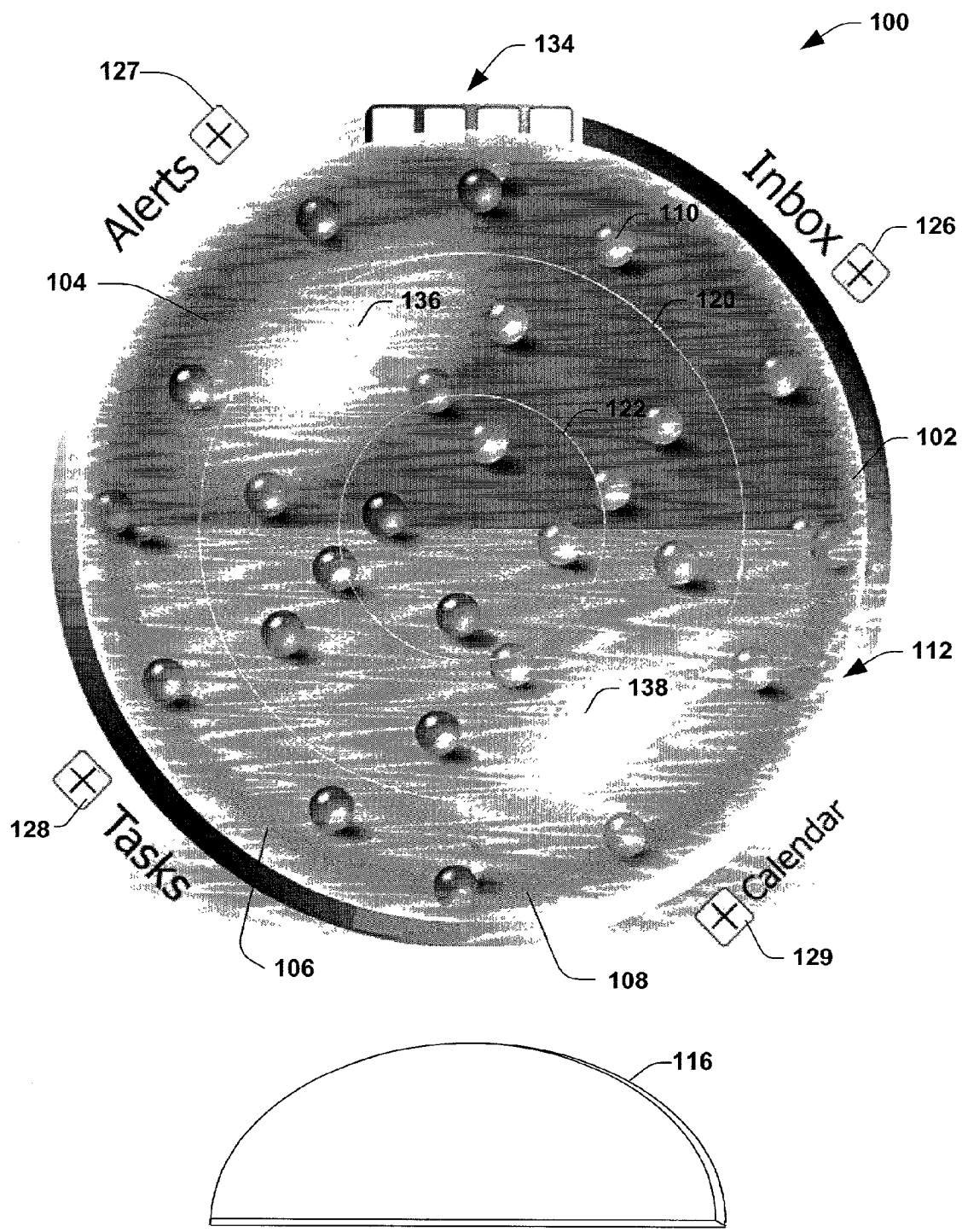
FIG. 5 is a diagram of an exemplary scope display in accordance with an aspect of the present invention.

Referring to FIG. 5, an exemplary scope display 100 is illustrated in accordance with the present invention. It is to be appreciated that the display 100 is but one of many possible display configurations that are in the spirit of the concepts previously described. For example, the display 100 can be arranged in a circular pattern of various colored wedges 102-108 having one or more spherical display objects (e.g., reference 110) that are associated with one or more prioritized notifications and/or other information such as the status of incoming appointments or background tasks. The display 100 includes a crystal/transparent scope cover 112 that appears over the display objects and wedges 102-108 in a third dimension toward the user. For clarity, the third dimension of the scope 112 is illustrated from a side view as a dome-shaped structure at reference 116. As illustrated, the scope 112 is divided into sections according to one or more concentric circles 120 and 122 that indicate priority boundaries within each wedge 102-108. For example, display objects appearing within the circle defined by 122 can represent high priority notifications, whereas display objects further away from center can be represented as lower priority items. It is to be appreciated that other arrangements are possible as described above (e.g., low priority objects toward center), and that the division into wedges or sectors is not limited to any specific number.

The wedges 102-108 can be associated with one or more sources or domains. In the illustrated example, sources such as inbox, alerts, tasks, and calendar are provided. Input selections 126-129 are provided to enable further configurations of the sources or domains and/or to view an aggregate of the one or more notifications associated with the selected source or domain. Selecting the display object such as 110, for example, enables a particular notification or meta item within the "inbox" wedge to be reviewed and/or drilled-down for more information. In addition, audio renderings can be initiated when the display objects are selected. As described above, this can include actual audio renderings of text and/or audio associated with the notifications and/or can include audio 'beeps" or "clicks" such as when a mouse is hovered over the display object, for example.

One or more scope configuration selections 134 can also be provided. These can include selection options such as close scope, change dimensional view of the scope, switch from source view to domain view on the wedges, select transparent mode, fast-forward, replay and configuring priority/notification options. As will be illustrated in more detail below, the scope 112 provides re-sizing capabilities over the entire portion and/or selected portions of the scope, such as can be initiated by dragging and selecting a mouse on the scope or portions thereof, for example. Some objects such as display objects 136 and 138, for example, may appear somewhat differently due to specular highlighting utilized on the scope 112.

According to another aspect of the present invention, the scope 100, can include one or more buttons (not shown) on the perimeter of wedges 102-108 that filter the views within the wedge by highlighting particular properties of items. For example, a user can click a button on the wedge 102-108 that filters e-mail by adding special colors to those e-mails that are "just to me" versus to me and others, or larger e-mail aliases. This can similarly be applied to e-mails that contain attachments that are from people on my team, for example. These filters can be overlayed as multiple dimensions of color, shape, attached icons, and so forth and the buttons can be toggled on and off.

Figure 6:
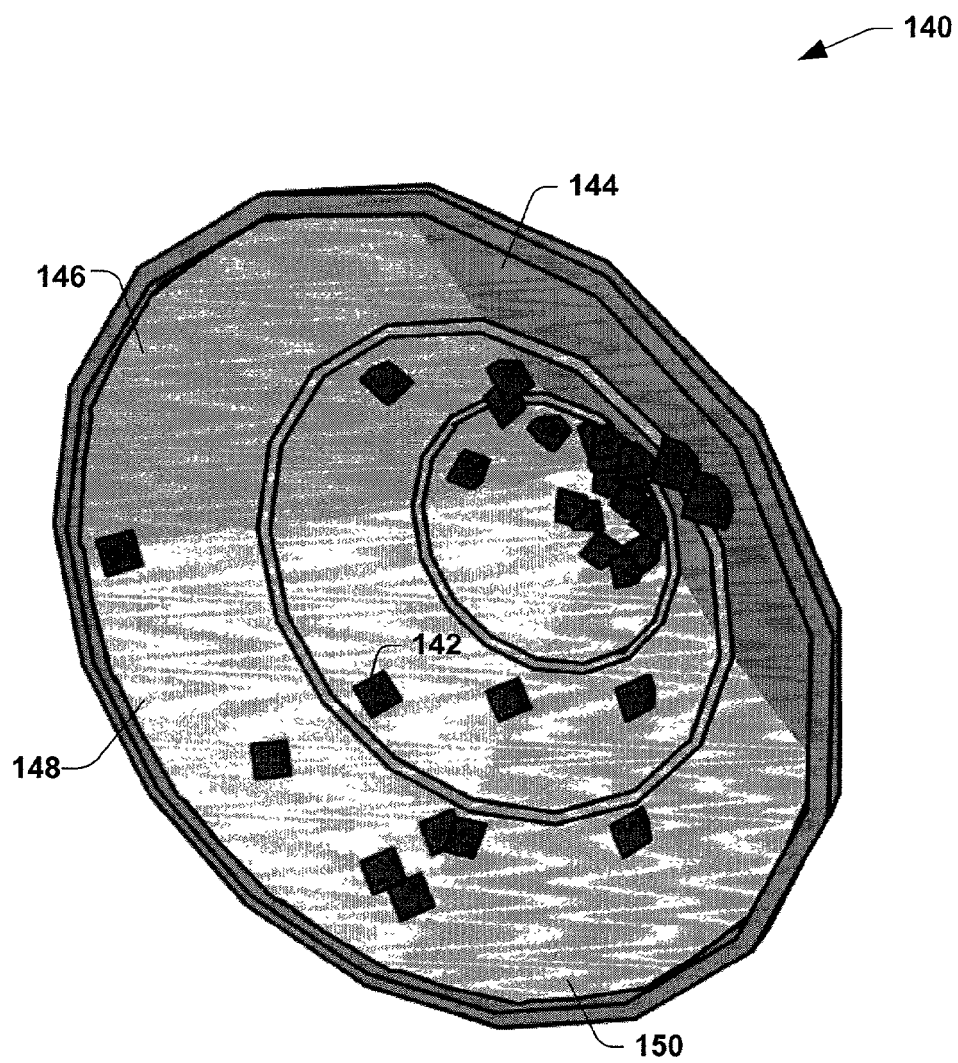
FIG. 6 is a diagram of an exemplary of three dimensional scope display in accordance with an aspect of the present invention.
Figure 7:
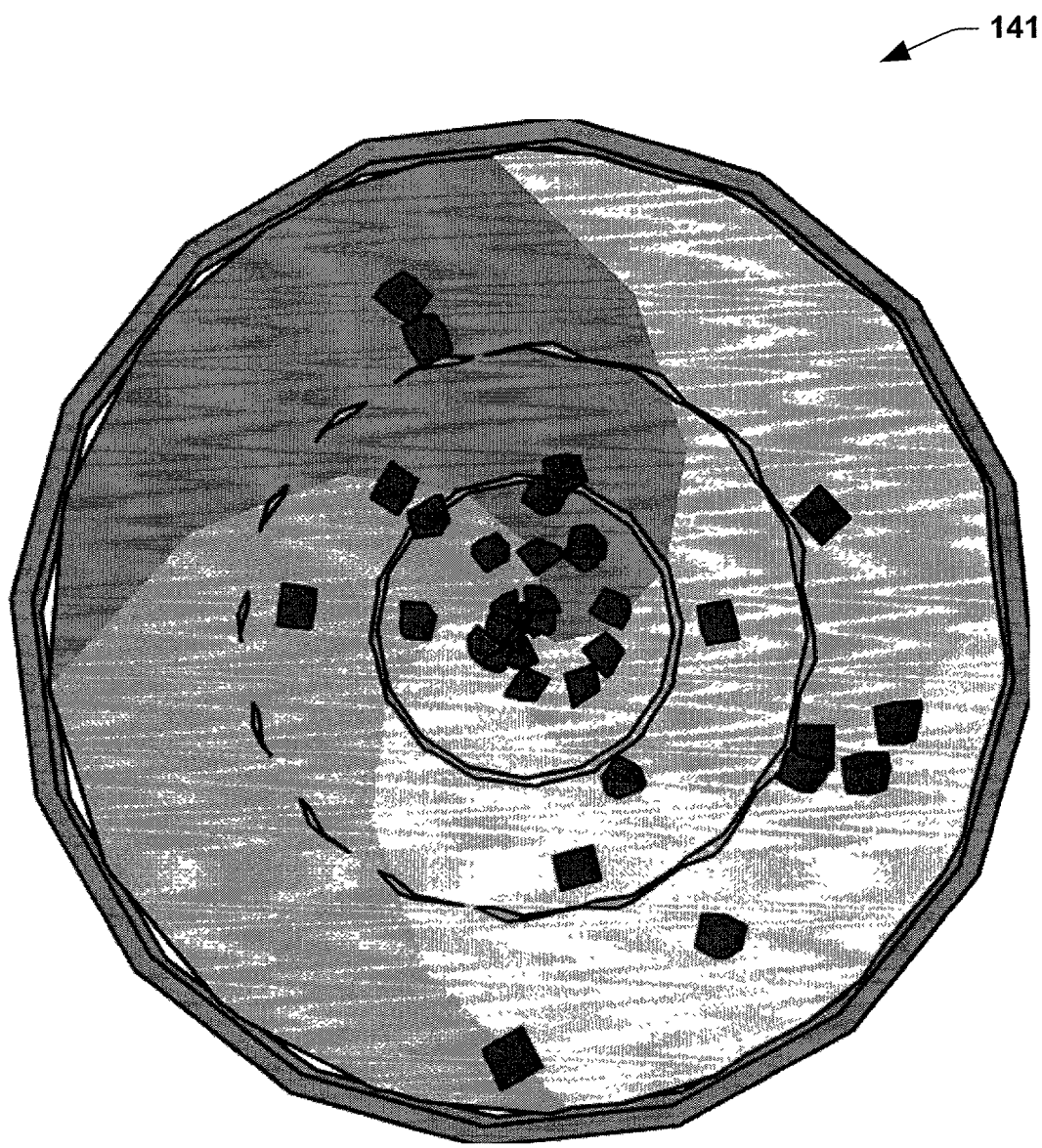
FIG. 7 is a top view of a three dimensional scope display in accordance with an aspect of the present invention.

Referring now to FIGS. 6 and 7, exemplary three-dimensional displays are illustrated in accordance with the present invention. FIG. 6 illustrates a display 140 as viewed from an angle, whereas FIG. 7 illustrates a display 141 with a "twist" applied to it. The twist enables providing more area for containing objects near the periphery of the display 141. As depicted in FIG. 6, display objects (e.g., 142) are concentrically located within one or more wedges 144-150 that are mapped to the display 140 according to notification priorities and the respective source or domain associated with the display objects. The view represented in FIGS. 6 and 7 provides a conic or parabolic view, although, it is to be appreciated that other three-dimensional renderings are possible such as cylindrical, cubicle, pyramidal, spherical and so forth. Histogram displays can also be provided/selected, wherein a gradated fill can be applied to the background of different regions of the display, whereby the intensity or color of the background at different areas indicates a number of items at that location. In addition, contouring can be utilized to provide a topological view of display objects across various sources, domains, classes and/or priorities.

Figure 8:
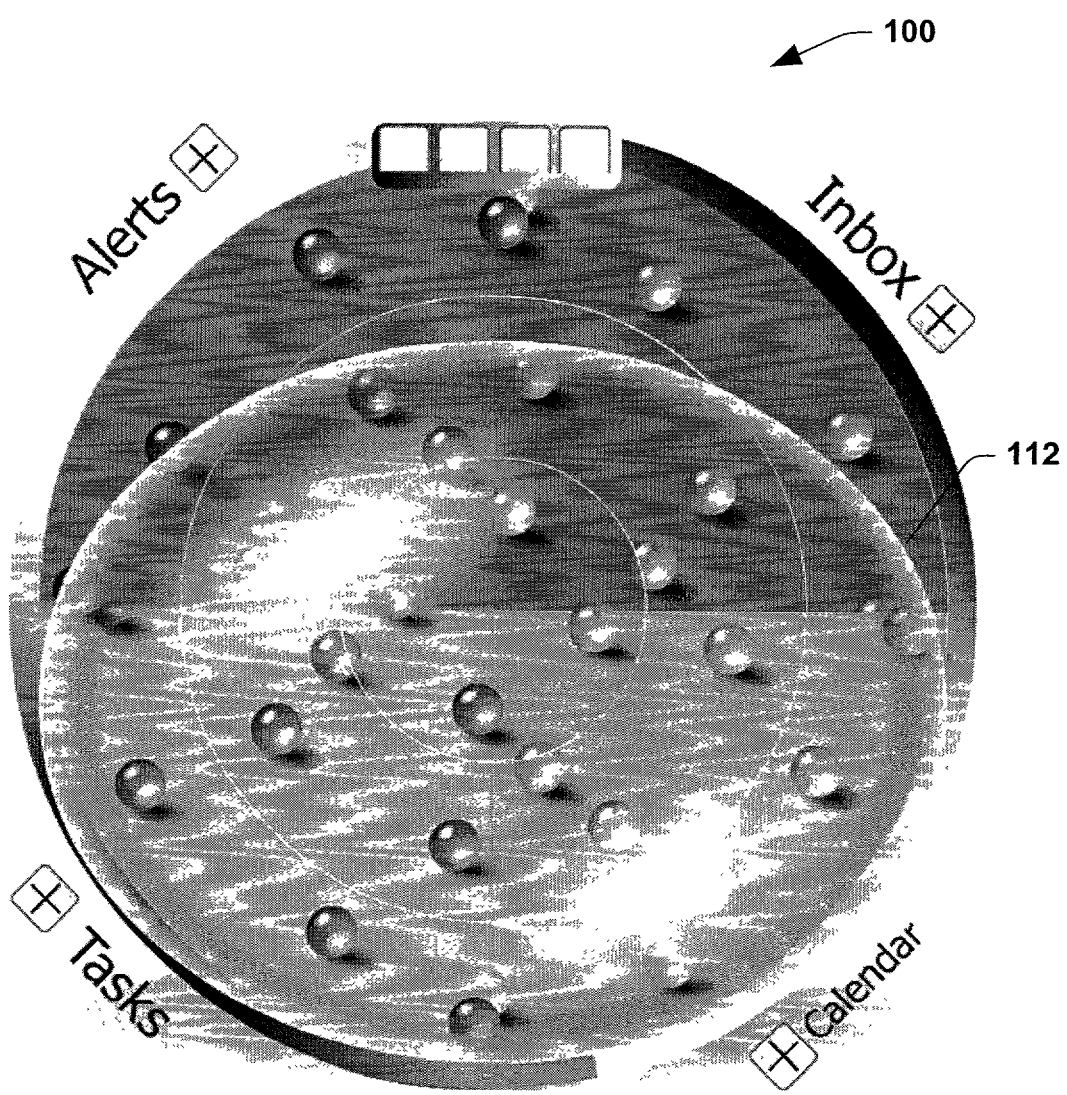
FIG. 8 is a diagram of a scope being unlocked in accordance with an aspect of the present invention.
Figure 9:
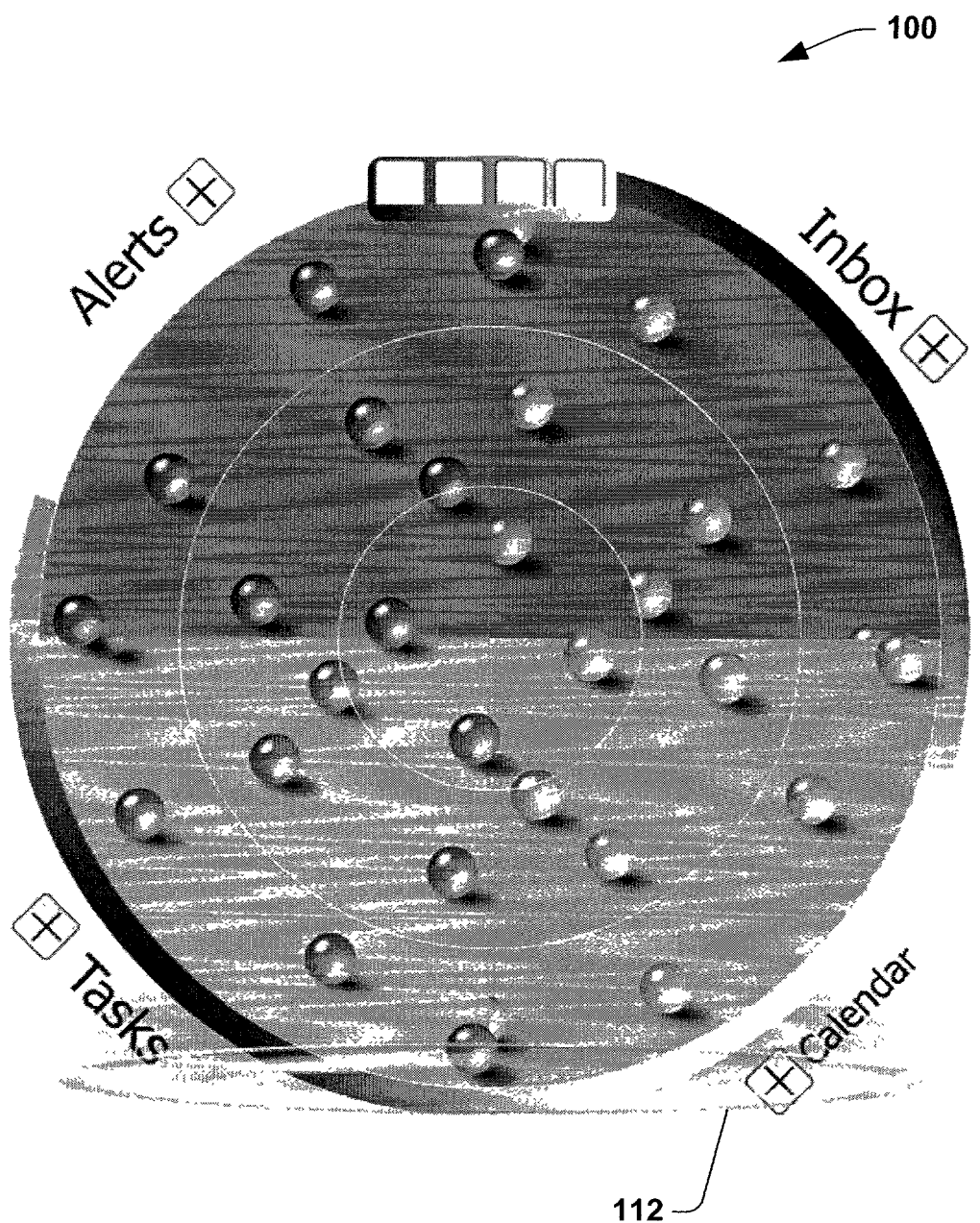
FIG. 9 is a diagram of an alternative unlocked scope in accordance with an aspect of the present invention.

Referring to FIGS. 8 and 9, an illustration is provided how the scope 112 depicted in FIG. 5 can be selectively adjusted/altered and employed in a training scenario (e.g., explicit training as described above) by the user (e.g., mouse selection and drag). Generally, the user cannot directly manipulate items—they are locked and their position is procedurally specified by the underlying software as a function of item type and priority. There are cases whereby the user may want to override this automatic categorization. To do this the user has to unlock the items for editing. One possible metaphor for this is that the user can open the "cover" on the scope 112, thus unlocking items. After direct manipulation of items is complete, the user then closes the "cover", thus again locking the items. As described above, the user's indication or override of the automatic categorization can be provided to the notification manager and/or prioritization system as feedback to tune or modify decision-making processes within these systems.

Figure 10:
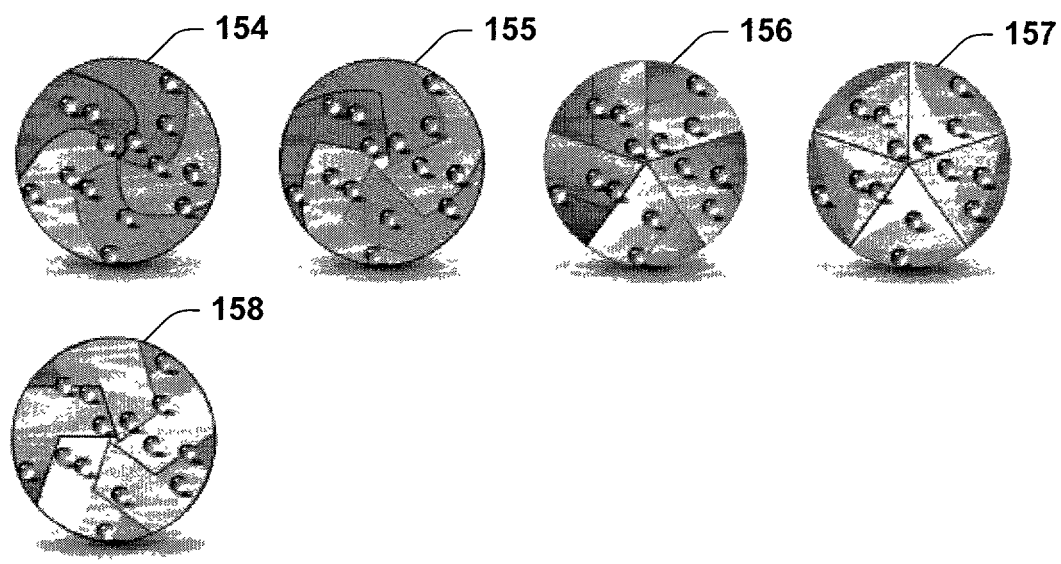
FIG. 10 is a diagram illustrating alternative arrangements of sectors on the scope surface into which informational items can be grouped in accordance with an aspect of the present invention.
Figure 11:
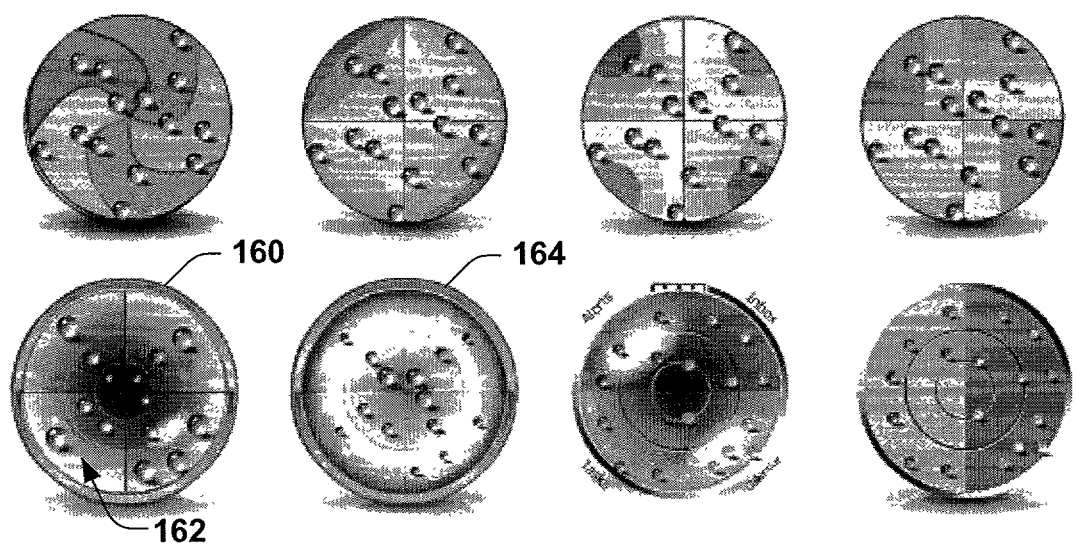
FIG. 11 is a diagram illustrating alternative scope displays in accordance with an aspect of the present invention.

FIGS. 10 and 11, illustrate various alternative display configurations in accordance with the present invention. A motivation for these alternative displays is to provide more space for higher priority items near the center of the displays. For example, in FIG. 10, a spiral display 154 having five sectors is illustrated. At 155, an interlocking sector arrangement is provided. At 156, individual wedges are further subdivided according to priority. At 157, a star shaped pattern is provided to define priority regions for one or more display objects. At 158, an alternative interlocking display subdivided according to priority is illustrated. FIG. 11 also provides various patterns that can be employed in accordance with the present invention. In particular, at 160, display object sizes are adjusted according to the assigned priority, wherein larger objects having higher priority are arranged near the outer portion 162 of the scope; the arrangement is intended to suggest the view into a funnel, with the center receding from the user. In contrast, a display 164 provides the larger, higher priority objects closer to the center of the display.

Figure 12:
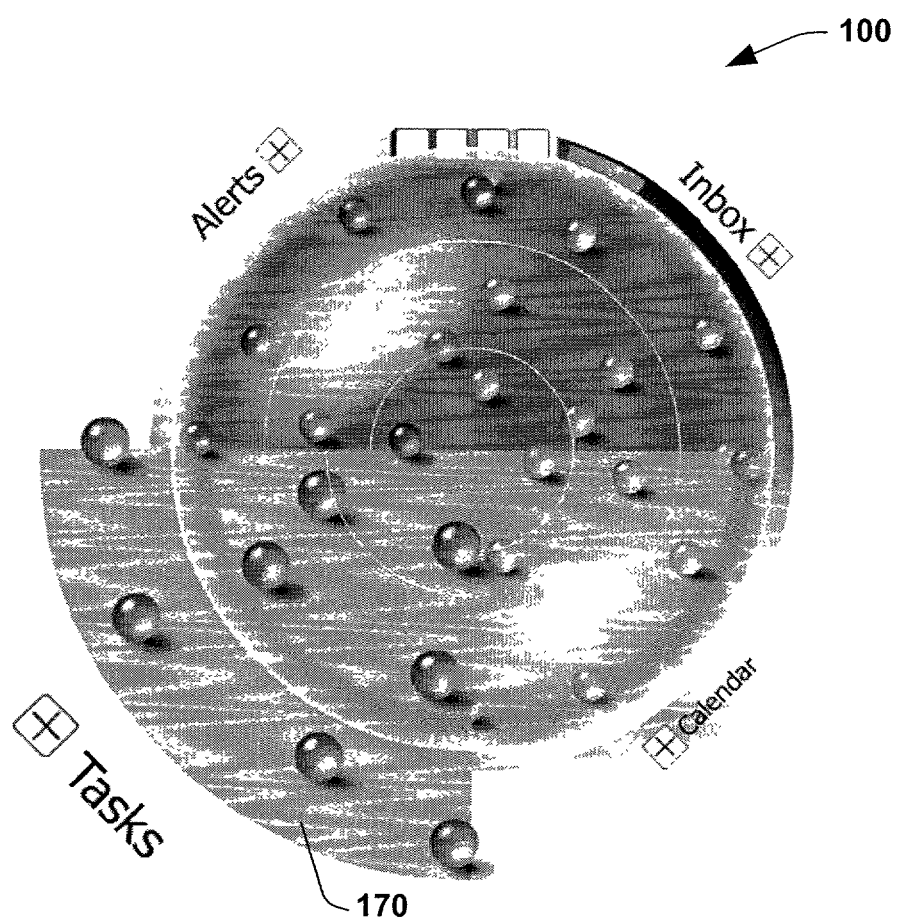
FIG. 12 is a diagram illustrating a partly expanded sector and display objects in accordance with an aspect of the present invention.
Figure 13:
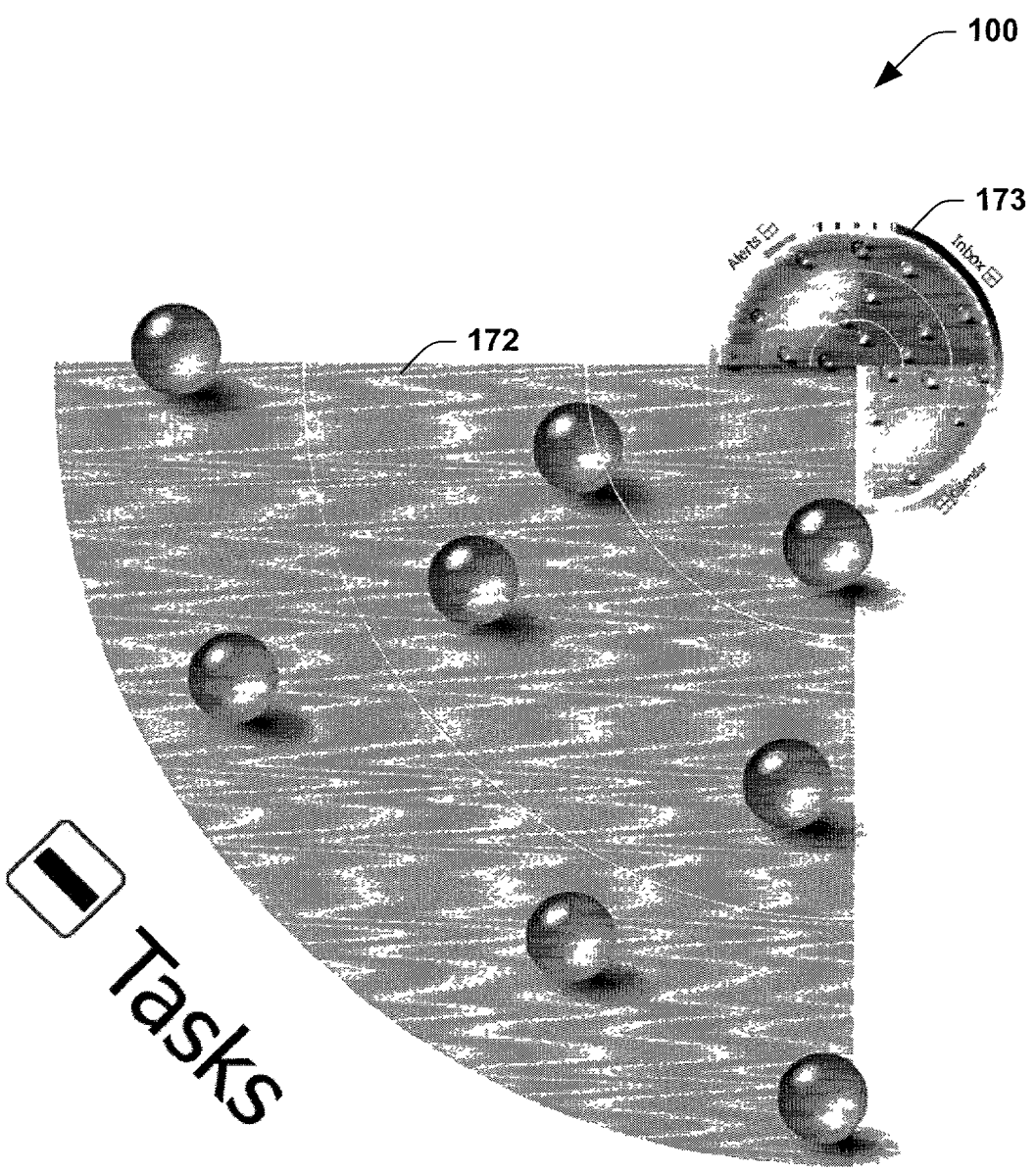
FIG. 13 is a diagram illustrating a fully expanded sector and display in accordance with an aspect of the present invention.

FIGS. 12 and 13 illustrate how various portions of the display 100 depicted in FIG. 5 can be utilized. It is noted that FIGS. 12 and 13 depict two exemplary "frames" from an ongoing animation that enlarges a sector 170 of the scope 100. In this particular animation, the user does not necessarily resize wedges utilizing drag and drop, for example; instead, there can be a toggle button (e.g., mouse click, input selection associated with the scope or portions thereof) that will enlarge one wedge and shrink the rest of the scope to make space for the wedge as depicted at 172 and 173 of FIG. 13. In an alternative aspect, the scope 100 can remain the same size and users can drag the boundaries of the wedges in order to occupy a larger arc. It is also noted that display items may reveal more detail when the wedge 170, 172 is enlarged. Such detail may include properties of the item (e.g., sender, item size, whether or not documents are attached, whether the user is the sole recipient or the item was sent to a group), or the detail might reveal more of the actual content of the item.

Figure 14:
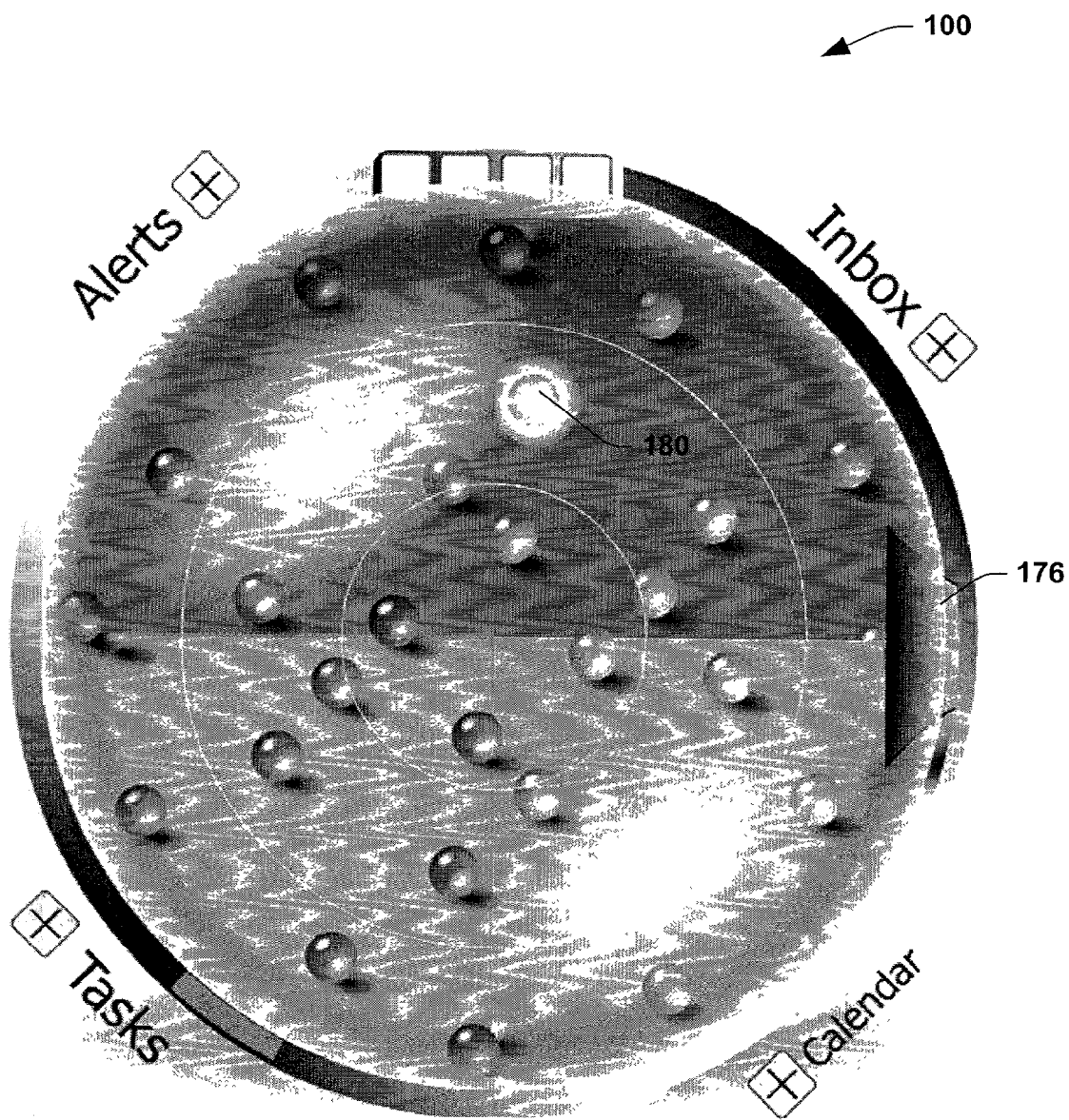
FIG. 14 is a diagram illustrating a highlighted display object in accordance with an aspect of the present invention, as well as an early moment in the appearance of a detail display for an information item, continued in FIG. 15.
Figure 15:
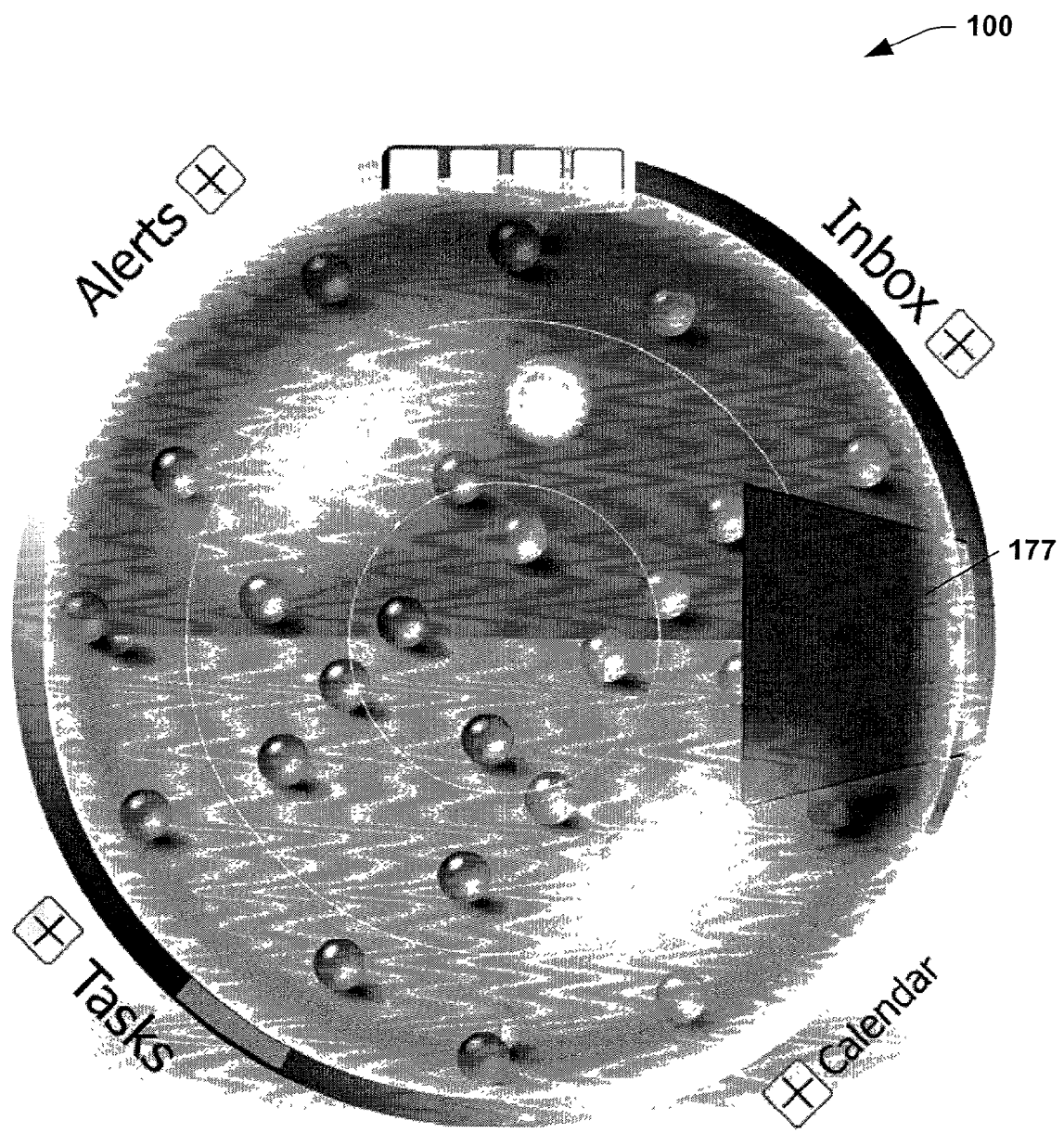
FIG. 15 is a diagram illustrating an animated display in accordance with an aspect of the present invention.
Figure 16:
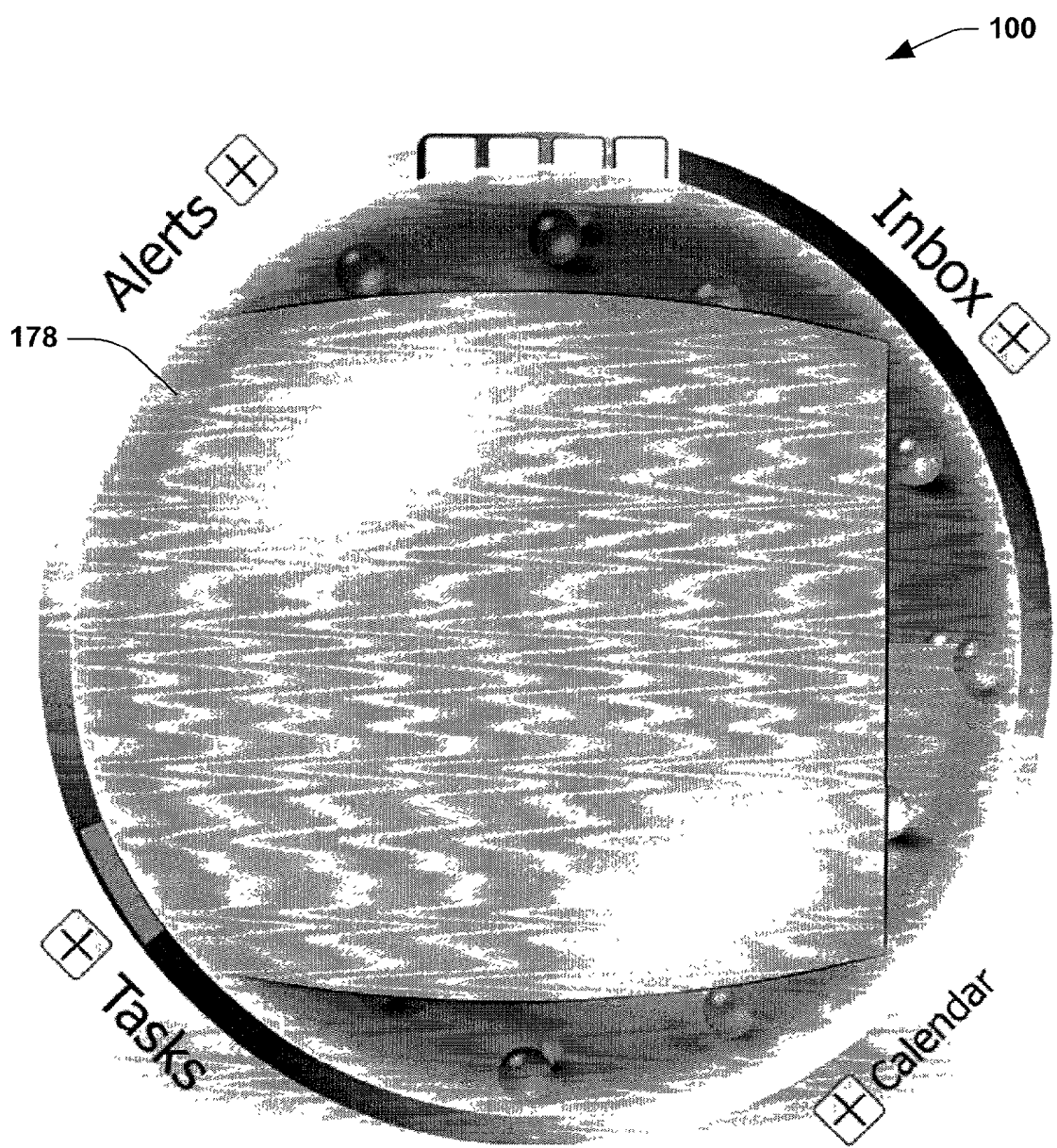
FIG. 16 is a diagram illustrating an animated display in accordance with an aspect of the present invention.
Figure 17:
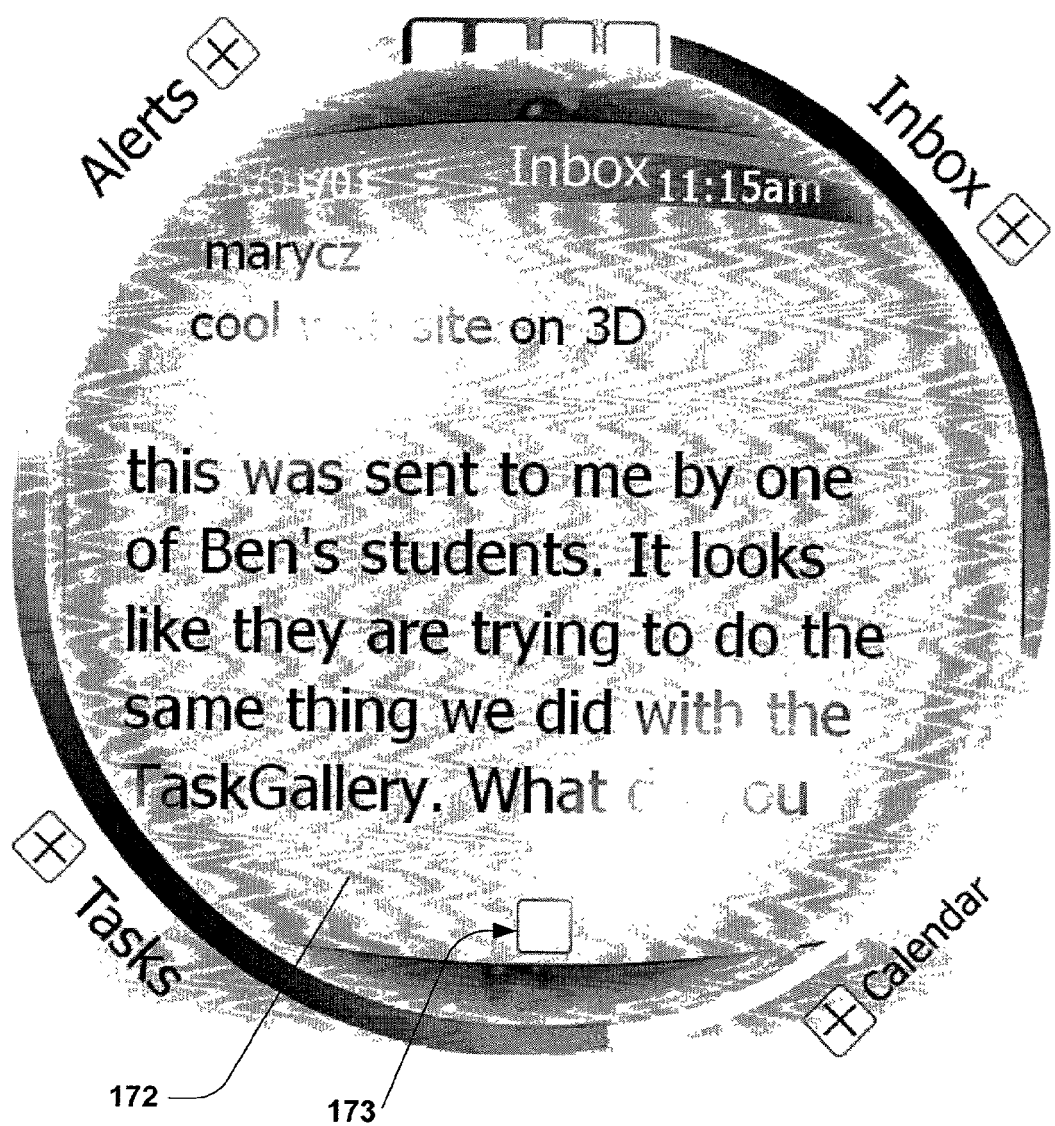
FIG. 17 is a diagram illustrating a crystal ball view of a notification in accordance with an aspect of the present invention.

FIGS. 14-17 are part of an exemplary animation. A "note" 176 is moving from the right of the scope 100 into view in FIG. 14 and illustrated at 177 in FIG. 15, and settles to reveal detail of an inspected item 172 in FIG. 17 such as a crystal ball view, wherein further detail can be viewed if desired via selection tab 173. FIG. 16 illustrates the start of an item 178 departing in an animated move towards the left. Referring back to FIG. 14, an item or other selection object 180 is touched by a user via a mouse or other selection device to be opened. FIG. 14 also illustrates how the display 100 can change over time. For example, the display object 180 is depicted as brighter or hotter than other display objects. As described above, this can occur, for example, if an urgent or other notification were to go un-reviewed or unattended over time. Alternatively, this can indicate that the object 180 is the most or least important (or other distinction) object within the wedge or area associated with the display object 180.

Figure 18:
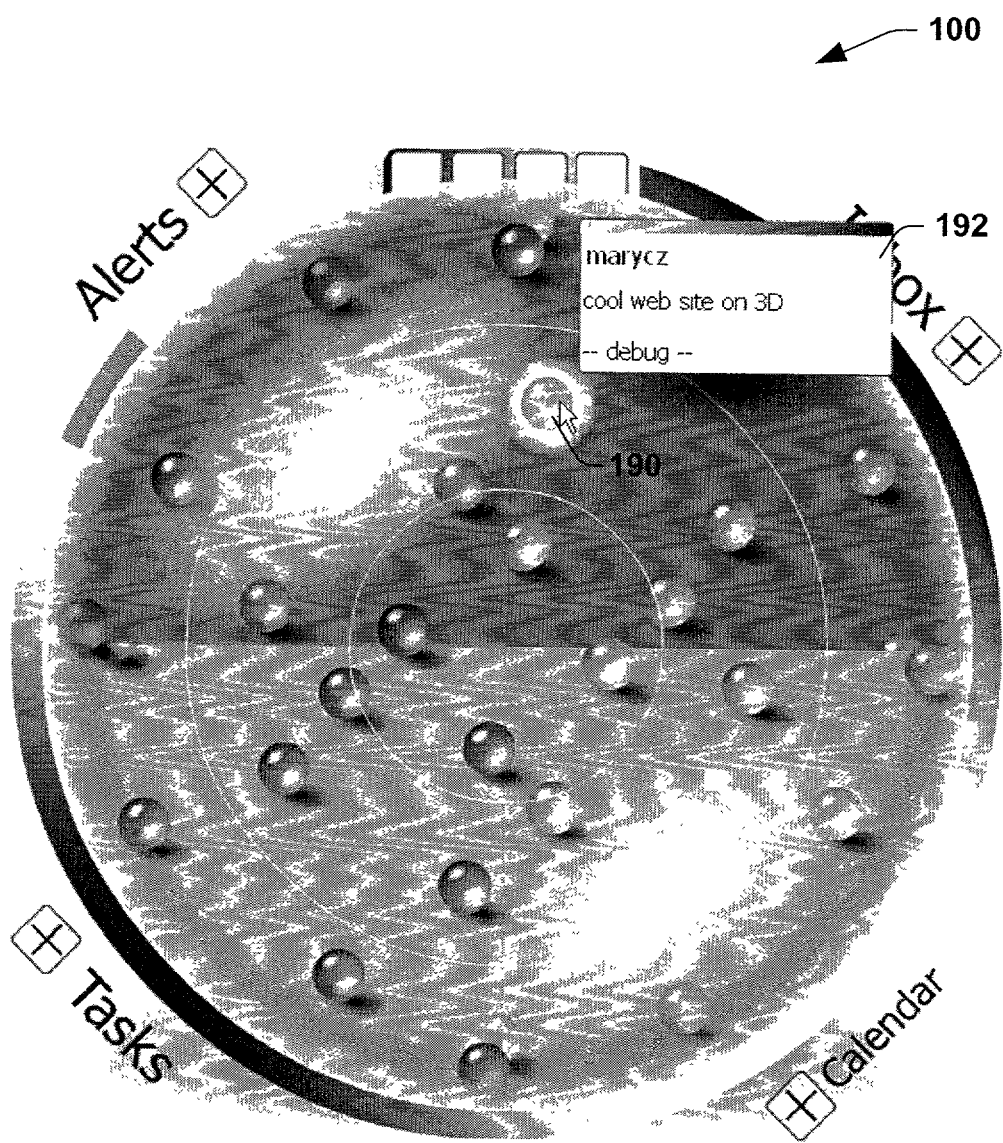
FIG. 18 is a diagram illustrating a display object with additional detail in accordance with an aspect of the present invention.

FIG. 18 illustrates how a mouse-over, depicted at display object 190, can provide a summary view 192 of the associated notification. It is noted that if re-sizing occurs on the overall display 100 and/or on objects/sectors therein, that more or less summary information can be provided, if not the entire notification, during a mouse-over or other user-directed interaction.

It is noted that other information and/or notifications can be prioritized and displayed in accordance with the present invention. For example, this can include background queries (e.g., while the user is working, text that the user is currently working on may be reviewed, such that background queries regarding the text are formulated and issued to search engines), and scheduling tasks from a scheduling and/or other program. Information or notification sources can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other information sources can include the following:

Personal information management applications such as calendar systems;
Computer systems (e.g., that may alert the user with messages that information about alerts about system activity or problems);
Internet-related services, appointment information, scheduling queries;
Changes in documents or numbers of certain kinds of documents in one or more shared folders;
Availability of new documents in response to standing or persistent queries for information;
Information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing");
Program source code changes being checked in to a source code repository database;
Level of activity or computed level of relevance of such activity on a mailing list, in a discussion board, or in an online conversation (chat room);
Investments (stocks) reaching a price level deemed to be interesting (e.g., an unusual high or low price); and/or
Real-time information sources on the Internet, such as traffic congestion, storm warnings, and so forth.

Figure 19:
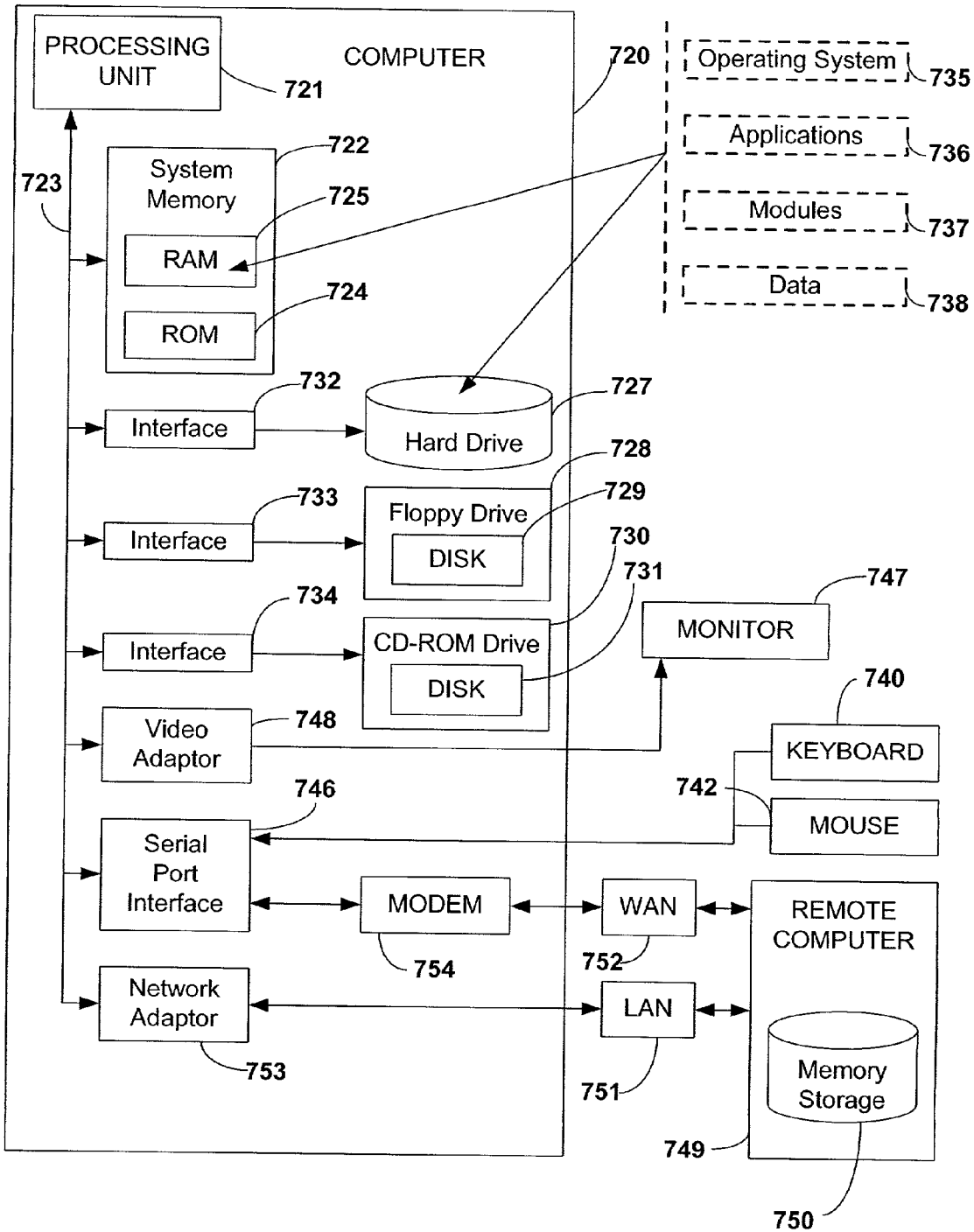
FIG. 19 is a schematic block diagram illustrating a suitable operating environment in accordance with an aspect of the present invention.

In order to provide a context for the various aspects of the invention, FIG. 19 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 19, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721.

The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system.

A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 19. The logical connections depicted in FIG. 19 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the local network 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

Figure 20:
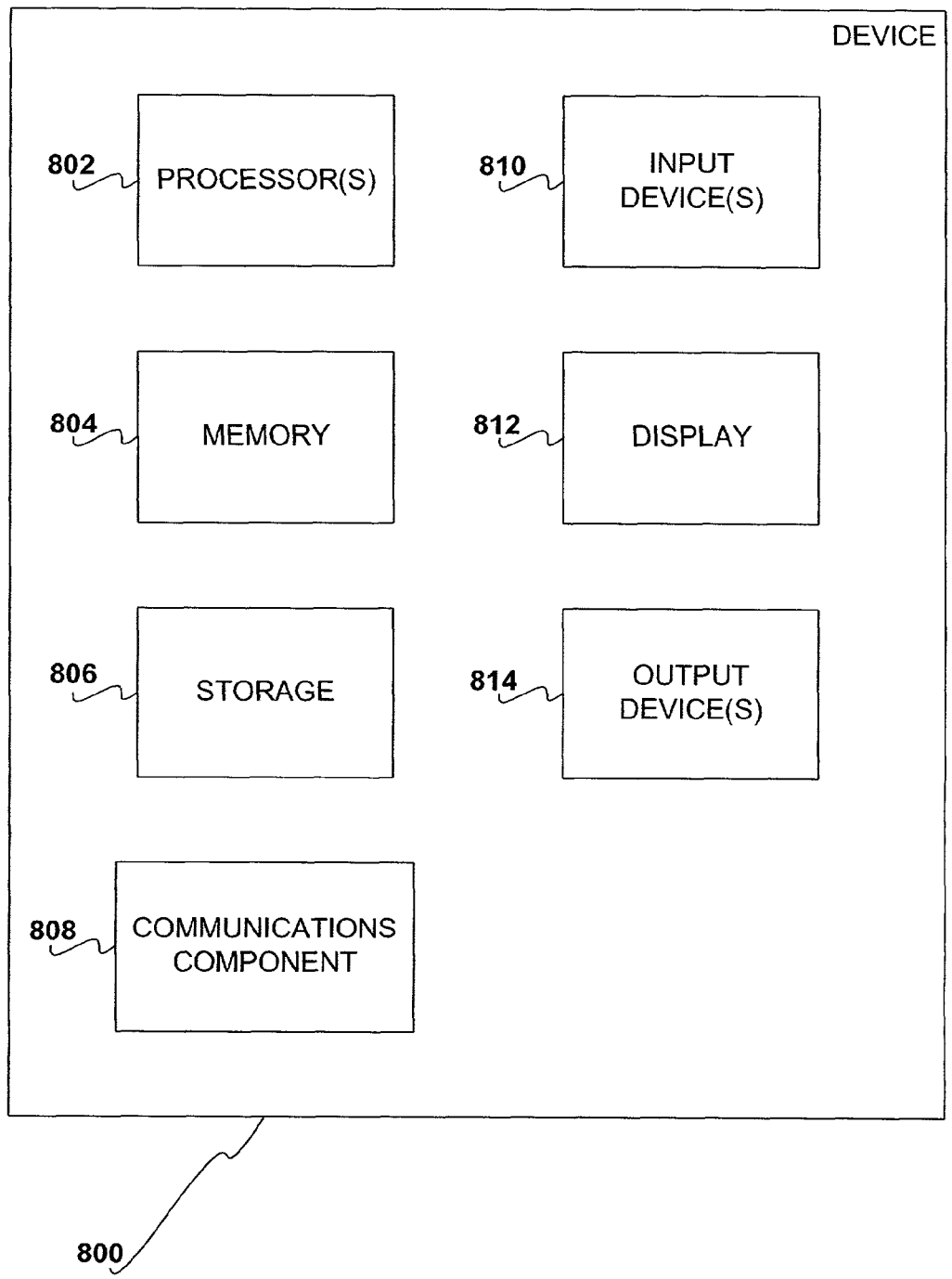
FIG. 20 is a schematic block diagram illustrating a suitable operating device in accordance with an aspect of the present invention.

Referring to FIG. 20, a diagram of an exemplary computerized device 800 that can be employed in conjunction with various aspects of the present invention is illustrated. The computerized device 800 can be, for example, a desktop computer, a laptop computer, a personal digital assistant (PDA), a cell phone, watch and so forth; the invention is not so limited. Those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments wherein tasks are performed by remote processing devices that are linked through a communications network.

The device 800 includes one or more of the following components: processor(s) 802, memory 804, storage 806, a communications component 808, input device(s) 810, a display 812, and output device(s) 814. It is noted, that for a particular instantiation of the device 800, one or more of these components may not be present. For example, a PDA may not have any output device(s) 814, while a cell phone may not have storage 806, etc. Thus, the description of the device 800 is to be utilized as an overview as to the types of components that typically reside within such a device 800, and is not meant as a limiting or exhaustive description of such computerized devices.

The processor(s) 802 may include a single central-processing unit (CPU), or a plurality of processing units, commonly referred to as a parallel processing environment. The memory 804 may include read only memory (ROM) and/or random access memory (RAM). The storage 806 may be any type of storage, such as fixed-media storage devices such as hard disk drives, flash or other non-volatile memory, as well as removable-media storage devices, such as tape drives, optical drives like CD-ROM's, floppy disk drives, etc. The storage and their associated computer-readable media provide non-volatile storage of computer-readable instructions, data structures, program modules and other data. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be employed.

Because the device 800 may operate in a network environment, such as the Internet, intranets, extranets, local-area networks (LAN's), wide-area networks (WAN's), etc., a communications component 808 can be present in or attached to the device 800. Such a component 808 may be one or more of a network card, such as an Ethernet card, an analog modem, a cable modem, a digital subscriber loop (DSL) modem, an Integrated Services Digital Network (ISDN) adapter, etc.; the invention is not so limited. Furthermore, the input device(s) 810 are the mechanisms by which a user indicates input to the device 800. Such device(s) 810 include keyboards, pointing devices, microphones, joysticks, game pads, satellite dishes, scanners, etc. The display 812 is how the device 800 typically directs output to the user, and can include, for example, cathode-ray tube (CRT) display devices, flat-panel display (FPD) display devices, etc. In addition, the device 800 may indicate output to the user via other output device(s) 814, such as speakers, printers, etc.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations and variations that fall within the spirit and scope of the appended claims.

What is claimed is:

1. A notification system, comprising:
    a priorities system that prioritizes one or more e-mails according to context; and
    a user interface that comprises a plurality of colored wedges with one or more objects displayed thereon, the wedges represent one of a user context or a source of the emails, the emails are represented by the one or more objects which are displayed based on respective priority, the user interface provides feedback about one or more user actions relating to at least some of the one or more e-mails, the one or more user actions comprising a time of response to the at least some of the one or more e-mails, reading the at least some of the one or more e-mails, deleting the at least some of the one or more e-mails or ignoring the at least some of the one or more e-mails,
    the priorities system configured to adjust its decision making regarding the prioritization of one or more subsequently received e-mails based on the feedback provided by the user interface, about the one or more user actions relating to the one or more e-mails.

2. The notification system of claim 1, wherein at least one of a shape and a color of the one or more display objects are indications of a priority of the one or more e-mails.

3. The notification system of claim 2, further comprising clustering rules for displaying N number of display objects in a display space, N being an integer, the clustering rules comprising rendering as many of the one or more display objects as can fit in the display space.

4. The notification system of claim 1, further comprising mapping rules for associating one or more display objects representing the one or more e-mails in a display space.

5. The notification system of claim 1, the user interface further configured to provide an indication of change over time associated with the one or more e-mails.

6. The notification system of claim 5, further comprising a fast forward and a replay selection to provide the indication of change over time.

7. The notification system of claim 1, the user interface further configured to render one or more display objects representing the one or more e-mails as brighter, darker, decaying, changing color or becoming more or less transparent to indicate change.

8. The notification system of claim 1, the user interface further configured to provide a summary or an enlargement of the one or more e-mails.

9. The notification system of claim 1, the user interface further configured to provide semantic zooming to enable users to receive various levels of information regarding the one or more e-mails.

10. The notification system of claim 1, the wedges are further divided into one of concentric circles, squares, rectangles, or triangles to facilitate delineating the respective priorities of the displayed objects.

11. The notification system of claim 1, the user interface comprises a transparent cover for the wedges and the display objects that mitigates inadvertent setting of priorities by a user such that the user can provide explicit training to the priorities system by removing the cover via a mouse selection and drag operation rearranging the display objects on the wedges and locking the cover in place after the rearrangement.

12. Computer-executable instructions for performing a method to provide prioritized e-mails, the computer-executable instructions stored on one or more computer-readable media, the method comprising,
    prioritizing one or more e-mails according to context;
    representing one of a context or a source of the one or more emails in a user interface as a plurality of colored sectors;

rendering the one or more e-mails based upon a priority of the one or more e-mails as corresponding objects on the sectors;

sensing a user's interaction with at least some of the one or more e-mails, the user's interaction with the at least some of the one or more e-mails comprising a time of response to the at least some of the one or more e-mails, reading the at least some of the one or more e-mails, deleting the at least some of the one or more e-mails or ignoring the at least some of the one or more e-mails; and adapting a decision relating to assigning a priority to one or more subsequently received e-mails based on the user's interaction with the at least some of the one or more e-mails.

13. A signal to transmit the computer-executable instructions for performing the method of claim 12.

14. A notification system, comprising, means for prioritizing at least one e-mail according to context;

means for rendering the at least one prioritized e-mail on a display as at least one object located according to its priority on one or more colored wedges that represent one of a domain or source of the email;

means for sensing a user's interaction with the at least one prioritized e-mail, the user's interaction comprising how fast a user responds to the at least one prioritized e-mail, whether the user reads the at least one prioritized e-mail or whether the user deletes or saves the at least one prioritized e-mail; and means for altering a decision about a priority of at least one subsequently received e-mail based on the user's interaction with the at least one prioritized e-mail.

15. A scope user interface, comprising:

at least one display object mapped to at least one of a plurality of e-mails prioritized according to context, the object is displayed based on an assigned priority on a portion of at least one display sector, wherein one or more display sectors represent one of contexts or sources of the e-mails; and a feedback component to sense a user's interaction with the scope user interface, wherein the scope user interface is configured to modify prioritization decisions about at least some subsequently received e-mails based on the user's interaction with the scope user interface, the user's interaction comprising how fast a user responds to a prioritized e-mail, whether the user reads the prioritized e-mail or whether the user deletes or saves the prioritized e-mail.

16. The user interface of claim 15, the sectors are arranged in a circular pattern.

* * * * *